(12) United States Patent
Bickham et al.

(10) Patent No.: US 7,050,687 B2
(45) Date of Patent: May 23, 2006

(54) LOW SLOPE DISPERSION SHIFTED OPTICAL FIBER

(75) Inventors: Scott R. Bickham, Corning, NY (US); Phong Diep, Horseheads, NY (US)

(73) Assignee: Corning Incorporated, Coring, NY (US)

( * ) Notice: Subject to any disclaimer, the term of this patent is extended or adjusted under 35 U.S.C. 154(b) by 51 days.

(21) Appl. No.: 10/365,731

(22) Filed: Feb. 12, 2003

(65) Prior Publication Data

US 2003/0174988 A1    Sep. 18, 2003

Related U.S. Application Data

(60) Provisional application No. 60/357,539, filed on Feb. 15, 2002.

(51) Int. Cl.
*G02B 6/02* (2006.01)
*G02B 6/22* (2006.01)

(52) U.S. Cl. ............... 385/127; 123/125; 123/126
(58) Field of Classification Search ......... 385/122–127
See application file for complete search history.

(56) References Cited

U.S. PATENT DOCUMENTS

| | | | |
|---|---|---|---|
| 4,770,492 A | 9/1988 | Levin et al. | 350/96.29 |
| 4,852,968 A | 8/1989 | Reed | 350/96.33 |
| 5,553,185 A | 9/1996 | Antos et al. | 385/127 |
| 5,684,909 A | 11/1997 | Liu | 385/127 |
| 5,838,867 A * | 11/1998 | Onishi et al. | 385/123 |
| 5,878,182 A | 3/1999 | Peckham | 385/123 |
| 5,905,838 A | 5/1999 | Judy et al. | 385/123 |
| 6,091,873 A | 7/2000 | Matsuo et al. | 385/123 |
| 6,266,467 B1 | 7/2001 | Kato et al. | 385/123 |
| 6,317,551 B1 * | 11/2001 | Mitchell et al. | 385/124 |
| 6,321,016 B1 | 11/2001 | Tirloni et al. | 385/127 |
| 6,434,310 B1 * | 8/2002 | Liu et al. | 385/123 |
| 6,507,689 B1 | 1/2003 | Tirloni et al. | 385/127 |
| 6,529,666 B1 | 3/2003 | Dultz et al. | 385/127 |
| 6,556,758 B1 | 4/2003 | Kato | 385/127 |
| 6,567,596 B1 | 5/2003 | Kato et al. | 385/123 |
| 6,577,800 B1 | 6/2003 | Sarchi et al. | 385/123 |
| 6,600,862 B1 | 7/2003 | Mukasa | 385/124 |
| 6,614,973 B1 | 9/2003 | de Montmorillon et al. | 385/123 |
| 6,633,714 B1 | 10/2003 | de Montmorillon et al. | 385/124 |
| 6,633,715 B1 * | 10/2003 | Knudsen et al. | 385/123 |
| 6,640,036 B1 | 10/2003 | Musaka et al. | 385/124 |

(Continued)

FOREIGN PATENT DOCUMENTS

EP    0959374 A1    11/1999

(Continued)

OTHER PUBLICATIONS

"Novel NZ-DSF with Ultra-low Dispersion Slope Lower Than 0.020 ps/nm$^2$/km"; Kumano, et al.; Two (2) Pages.

(Continued)

*Primary Examiner*—Nikita Wells
*Assistant Examiner*—Paul M. Gurzo
(74) *Attorney, Agent, or Firm*—Joseph M. Homa

(57) ABSTRACT

A low slope dispersion shifted optical waveguide fiber having an effective area of less than about 60 μm$^2$ at a wavelength of about 1550 nm, a zero-dispersion wavelength of less than about 1430 nm, a dispersion of between about 4 ps/nm/km and about 10 ps/nm/km at a wavelength of about 1550 nm, a dispersion slope of less than 0.045 ps/nm$^2$/km at a wavelength of about 1550 nm, and a cabled cutoff wavelength of less than about 1260 nm.

39 Claims, 18 Drawing Sheets

U.S. PATENT DOCUMENTS

| | | | |
|---|---|---|---|
| 6,668,120 B1 * | 12/2003 | Sillard et al. | 385/123 |
| 6,684,016 B1 | 1/2004 | Kim et al. | 385/123 |
| 6,684,018 B1 | 1/2004 | Arai et al. | 385/127 |
| 6,694,079 B1 | 2/2004 | Matsuo et al. | 385/123 |
| 6,704,486 B1 | 3/2004 | Kamiya | 385/124 |
| 2001/0021291 A1 | 9/2001 | Miyakawa et al. | 385/27 |
| 2002/0168159 A1 | 11/2002 | Takahashi et al. | 385/123 |
| 2003/0007775 A1 | 1/2003 | Takahaski | 385/147 |
| 2003/0021562 A1 | 1/2003 | Kumano | 385/123 |
| 2003/0081889 A1 | 5/2003 | Akasaka et al. | 385/24 |
| 2003/0081921 A1 | 5/2003 | Sillard et al. | 385/124 |
| 2003/0108318 A1 | 6/2003 | Arai et al. | 385/127 |
| 2003/0118304 A1 | 6/2003 | Shibuta | 385/124 |
| 2003/0147610 A1 | 8/2003 | Tsukitani et al. | 385/127 |
| 2003/0152347 A1 | 8/2003 | Matsuo et al. | 385/123 |

FOREIGN PATENT DOCUMENTS

| | | |
|---|---|---|
| EP | 1120671 | 7/2000 |
| EP | 1211533 A2 | 6/2002 |
| EP | 1308755 | 10/2002 |
| WO | WO97/33188 | 9/1997 |
| WO | WO99/42869 | 8/1999 |
| WO | WO00/14580 | 3/2000 |
| WO | WO0214919 | 2/2002 |
| WO | WO0219576 | 3/2002 |

OTHER PUBLICATIONS

Akasaki, et al., "*Enlargement of effective core area on dispersion-flattened fiber and its low nonlinearity*", OFC '98 Technical Digest, pps. 302-303.

Liu et al., "*Design and Fabrication of Locally Dispersion-Flattened Large Effective Area Fibers*", ECOC '98, Sep. 20-24, 1998, Madrid, SPain, pps. 37-38.

Peckham, et al., "*Reduced Dispersion Slope, Non-Zero Dispersion Fiber*", ECOC '98, Sep. 20-24, 1998, Madrid, Spain, pps. 139-140.

Yokoyama, et al., "*Practically Feasible Dispersion Flattened Fibers Produced by VAD Technique*", ECOC '98, Sep. 20-24, 1998, Madrid, Spain, pps. 131-132.

Kumano, et al., "*Novel NZ-DSF with Ultra-low Dispersion Slope Lower than 0.020 ps/nm2/km*", ECOC '01 vol. 6, Sep. 30-Oct. 4, 2001, pps. 54-55.

Safaai-Jazi, et al., "*Evaluation of chromatic dispersion in W-type fibers*",Optics Letters vol. 14 No. 14, Jul. 15, 1989, pps. 760-762.

Hatayama, et al., "*Dispersion flattened fiber with large-effective-core area more than 50 $\mu^2$*",OFC'98 Technical Digest, Feb. 22-27, 1998, San Jose, California, pps. 304-305.

Lieber, et al., "*Three-Step Index Strictly Single-Mode, Only F-Doped Silica Fibers for Broad-Band Low Dispersion*", Journal of Lightwave Technology, vol. Lt04, No. 7, Jyl. 1986, pps. 715-719.

Gao, et al., "*Attenuation-Optimized Dispersion-Flattened Quadruple-Clad Fibers with Moderate F-Doping in the First Inner Cladding*", IEEE Photonics Technology Letters, vol. 4, No. 6, Jun. 1992, pps. 638-641.

*TrueWave®RS Nonzero-Dispersion Optical Fiber Optimized for the Third and Ready for the Fourth Wavelength Window!*, Lucant Technologies, Jun. 1998.

* cited by examiner

LOW SLOPE DISPERSION SHIFTED OPTICAL FIBER

This application claims the benefit of priority under 35 U.S.C. § 119(e) of U.S. Provisional Application Ser. No. 60/357,539 filed on Feb. 15, 2002.

BACKGROUND OF THE INVENTION

1. Field of the Invention

The present invention relates to non-zero dispersion shifted optical fibers (NZDSF) having low slope. More preferably, the present invention relates to NZDSF fibers having low slope and low zero dispersion wavelength.

2. Technical Background

Wavelength division multiplexing (WDM) systems have operated around the 1550 nm wavelength region, defined herein as including the C-band, which includes wavelengths between about 1525 nm to about 1565, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). However, the zero dispersion wavelength of known NZDSF fibers is typically within 100 nm of 1550 nm in order to reduce the magnitude of the dispersion of a transmitted signal in the 1550 nm operating window so as to allow longer span lengths and less frequent dispersion compensation.

Preferably, coarse wavelength division multiplexing (CWDM) systems and applications operate in the WDM 1550 nm window, i.e. in the C- and L-bands, in the S-band (between about 1450 nm and about 1525 nm), and in the 1310 nm window (between about 1280 nm and about 1330 nm).

Known fibers have optical characteristics which are suitable for operation in specific windows. For example, standard single mode transmission fibers, such as the SMF-28™ optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km, which is larger than the dispersion at 1550 nm of typical NZDSF fiber, and which can require frequent dispersion compensation. NZDSF optical fiber can perform suitably in the 1550 nm window. Examples of NZDSF fiber include: LEAF® fiber by Corning Incorporated which has an average zero dispersion wavelength near 1500 nm and a dispersion slope of about 0.08 ps/nm/km at about 1550 nm, Submarine LEAF® fiber by Corning Incorporated which has an average zero dispersion wavelength near 1590 nm and a dispersion slope of about 0.1 ps/nm/km at about 1550 nm, MetroCor™ fiber by Corning Incorporated which has a zero dispersion wavelength near 1650 nm, and Truewave RS™ fiber by Lucent Corporation which has a zero dispersion wavelength of about 1450 nm. However, the magnitude of the dispersion in the 1310 nm window of these NZDSF optical fibers is not low, and many NZDSF fibers have specified cable cutoff wavelengths which are greater than 1260 nm.

SUMMARY OF THE INVENTION

One aspect of the present invention relates to an optical waveguide fiber having an effective area of less than about 60 $\mu m^2$ at a wavelength of about 1550 nm, a zero-dispersion wavelength of less than about 1430 nm, a dispersion of between about 4 ps/nm/km and about 10 ps/nm/km at a wavelength of about 1550 nm, a dispersion slope of less than 0.045 $ps/nm^2/km$ at a wavelength of about 1550 nm, and a cabled cutoff wavelength of less than about 1260 nm.

Preferably, the effective area at a wavelength of about 1550 nm is less than about 58 $\mu m^2$, more preferably less than about 55 $\mu m^2$.

Preferably, the zero-dispersion wavelength is between about 1350 nm and about 1430 nm, more preferably between about 1370 nm and about 1410 nm.

Preferably, the dispersion of the optical fiber at a wavelength of about 1550 nm is between about 5 ps/nm/km and about 9 ps/nm/km, more preferably between about 6 ps/nm/km and about 8 ps/nm/km.

Preferably, the dispersion of the optical fiber is between about 3 ps/nm/km and about 7 ps/nm/km at a wavelength of about 1530 nm, more preferably between about 4 ps/nm/km and about 6 ps/nm/km at a wavelength of about 1530 nm The dispersion slope of the optical fiber at a wavelength of about 1550 nm is preferably less than about 0.042 $ps/nm^2/km$, more preferably less than about 0.040 $ps/nm^2/km$, and even more preferably less than about 0.038 $ps/nm^2/km$. The dispersion slope is preferably greater than about 0.020 $ps/nm^2/km$ at a wavelength of about 1550 nm, more preferably greater than about 0.030 $ps/nm^2/km$ at a wavelength of about 1550 nm.

Preferably, the cabled cutoff wavelength of the optical fiber is less than about 1240 nm, more preferably less than about 1220 nm, even more preferably less than about 1200 nm. The theoretical cutoff wavelength is preferably less than about 1650 nm, more preferably less than about 1630 nm, even more preferably less than about 1610 nm. The 2 m measured fiber cutoff is preferably less than about 1500 nm. Preferably, the fundamental mode cutoff wavelength, LP01, is greater than about 3500 nm, more preferably greater than about 4000 nm.

The dispersion of the optical waveguide fiber at a wavelength of about 1310 nm is preferably less than zero, more preferably between 0 ps/nm/km and about −7.5 ps/nm/km, even more preferably between about 0 ps/nm/km and about −6 ps/nm/km. In one preferred embodiment, the dispersion at a wavelength of about 1310 nm is less than about 0 ps/nm/km and greater than about −5 ps/nm/km. In another preferred embodiment, the dispersion at a wavelength of about 1310 nm is less than about −4 ps/nm/km and greater than about −7.5 ps/nm/km.

Preferably, the attenuation of the optical waveguide fiber at a wavelength of about 1550 nm is less than about 0.23 dB/km, more preferably less than about 0.22 dB/km, even more preferably less than about 0.21 dB/km, and still more preferably less than about 0.20 dB/km.

The attenuation of the optical waveguide fiber at a wavelength of about 1383 nm is preferably less than about 0.6 dB/km, more preferably less than about 0.5 dB/km, even more preferably less than about 0.4 dB/km. In one preferred embodiment, the attenuation at a wavelength of about 1383 nm is not more than about 0.1 dB/km higher than the attenuation at a wavelength of about 1310 nm. In another preferred embodiment, the attenuation at a wavelength of about 1383 nm is not more than about 0.05 dB/km higher than the attenuation at a wavelength of about 1310 nm. In yet another preferred embodiment, the attenuation at a wavelength of about 1383 nm is not more than the attenuation at a wavelength of about 1310 nm. In still another preferred embodiment, the attenuation at a wavelength of about 1383 nm is less than the attenuation at a wavelength of about 1310 nm.

Preferably, the polarization mode dispersion of the optical fiber at a wavelength of about 1550 nm is less than about 0.1 ps/km$^{1/2}$, more preferably less than about 0.06 ps/km$^{1/2}$, even more preferably less than about 0.04 ps/km$^{1/2}$, and still more preferably less than about 0.03 ps/km$^{1/2}$.

The optical waveguide fiber preferably exhibits a pin array bending loss at a wavelength of about 1600 nm which is less than about 25 dB/km, more preferably less than about 15 dB/km, and even more preferably less than about 10 dB/km. The optical waveguide fiber preferably exhibits a pin array bending loss at a wavelength of about 1550 nm which is less than about 20 dB/km, more preferably less than about 15 dB/km, and even more preferably less than about 10 dB/km.

Preferably, the optical fiber disclosed herein exhibits attenuation at a wavelength of about 1550 nm induced by a lateral load microbend test which is less than about 1.5 dB/m, more preferably less than about 1 dB/m.

Preferably, the optical waveguide fiber comprises: a central region extending radially outward from the centerline and having a positive relative refractive index percent, $\Delta_1$ %(r) with a maximum relative refractive index percent, $\Delta_{1,MAX}$; a first annular region surrounding the central region and having a negative relative refractive index percent, $\Delta_2$ %(r), with a minimum relative refractive index percent, $\Delta_{2,MIN}$; a second annular region surrounding the first annular region and having a positive relative refractive index percent, $\Delta_3$ %(r) with a maximum relative refractive index percent, $\Delta_{3,MAX}$; and an outer annular cladding region surrounding the second annular region and having a relative refractive index percent, $\Delta_c$ %(r).

Preferably, the first annular region is adjacent the central region. Preferably, the second annular region is adjacent the first annular region.

Preferably, $\Delta_{1,MAX}$ is between about 0.4% and 0.7%, and more preferably $\Delta_{1,MAX}$ is between about 0.45% and 0.65%. In a preferred embodiment, $\Delta_{1,MAX}$ is between about 0.5% and 0.65%.

The central region preferably extends to a radius of between about 3 µm and about 6 µm, more preferably to a radius of between about 3 µm and about 5 µm.

Preferably, the central region has an alpha of between about 1 and about 6, more preferably between about 2 and about 4.

Preferably, $\Delta_{2,MIN}$ is between about −0.05% and −0.35%, more preferably between about −0.1% and −0.30%, and most preferably between about −0.14% and −0.25%. Preferably, the absolute value of the difference between $\Delta_{1,MAX}$ and $\Delta_{2,MIN}$ is between about 0.45% and about 1.05%, more preferably between about 0.55% and about 0.95%.

The first annular region preferably surrounds the central region and extends to a radius of between 5 µm and about 9 µm, more preferably to a radius of between 6 µm and about 8 µm, and most preferably to a radius of between about 3.5 µm about 7.5 µm. Preferably, at least a portion of the first annular region is disposed between a radius of 4 µm and a radius of about 8 µm.

The first annular region preferably has a width of between about 1.5 µm and about 4.5 µm, more preferably between about 2 µm and about 4 µm.

Preferably, the first annular region has a midpoint between about 4 µm and about 6.5 µm, more preferably between about 4.5 µm and about 6 µm.

Preferably, $\Delta_{3,MAX}$ is between about 0.1% and 0.3%, more preferably between about 0.15% and 0.3%. Preferably, the difference between $\Delta_{1,MAX}$ and $\Delta_{3,MAX}$ is between about 0.1% and about 0.6%, more preferably between about 0.15% and about 0.5%. Preferably, $\Delta_{1,MAX}$ is greater than $\Delta_{3,MAX}$.

The second annular region preferably surrounds the first annular region and extends to a radius of between about 9 µm and about 15 µm, more preferably to a radius of between about 10 µm and about 14 µm.

The second annular region preferably has a width of between about 2 µm and about 8 µm, more preferably between about 3 µm and about 7 µm. The second annular region preferably has a half-height peak width of between about 3 µm and about 9 µm, more preferably between about 3.5 µm and about 8.5 µm, and even more preferably between about 4 µm and about 8 µm. The midpoint of the half-height peak width is between about 7.5 µm and about 10.5 µm, more preferably between about 8 µm and about 10 µm.

In some preferred embodiments, the optical waveguide fiber includes a third annular region surrounding the second annular region and disposed between the second annular region and the outer annular cladding region, the third annular region having a negative relative refractive index percent, $\Delta_4$%(r) with a minimum relative refractive index percent, $\Delta_{4,MIN}$. Preferably, the third annular region is adjacent the second annular region. Preferably, the optical fiber has a third annular region, and $\Delta_{2,MIN}$ is preferably between about −0.05% and −0.3%, more preferably between about −0.1% and −0.25%.

In some preferred embodiments, $\Delta_{2,MIN}$ is greater than $\Delta_{4,MIN}$. In other preferred embodiments, $\Delta_{2,MIN}$ is less than $\Delta_{4,MIN}$. In still other preferred embodiments, $\Delta_{2,MIN}$ is about equal to $\Delta_{4,MIN}$.

The third annular region preferably extends from a radius of between about 9 µm and about 15 µm to a radius of between 12 µm and about 20 µm. More preferably, the third annular region extends from a radius of between about 10 µm and about 14 µm to a radius of between 13 µm and about 18 µm.

Preferably, the third annular region has a width of between about 1.5 µm and about 7 µm, more preferably between about 2 µm and about 6 µm.

Preferably, the third annular region has a midpoint between about 11 µm and about 18 µm., more preferably between about 12 µm and about 16 µm.

Preferably, the central region contains no downdopant.

Another aspect of the present invention relates to an optical waveguide preform comprising: a central region, a first annular region surrounding the central region, a second annular region surrounding the first annular region, and an outer annular cladding region surrounding the second annular region. The outer annular cladding region has a minimum radius, $r_{c,min}$. The central region preferably has a normalized maximum radius, $r_1/r_{c,min}$, of between about 0.2 and about 0.45, and the first annular region preferably has a normalized maximum radius, $r_2/r_{c,min}$, of between about 0.3 and about 0.65.

The optical waveguide preform may further comprise a third annular region disposed between the second annular region and the outer annular cladding. Preferably, the outer annular cladding region is adjacent the third annular region.

The relative refractive index profiles of the central region and first, second and third annular regions correspond to the profiles of the optical fiber disclosed herein. Preferably, the central region has a normalized maximum radius, $r_1/r_{c,min}$, of between about 0.2 and about 0.3, the first annular region has a normalized maximum radius, $r_2/r_{c,min}$, of between about 0.35 and about 0.55, and the second annular region has a normalized maximum radius, $r_3/r_{c,min}$, of between about 0.7 and about 0.85.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings. An exemplary embodiment of a segmented core refractive index profile in accordance with the present invention is shown in each of the figures.

DETAILED DESCRIPTION OF THE PREFERRED EMBODIMENT

Figure 1:
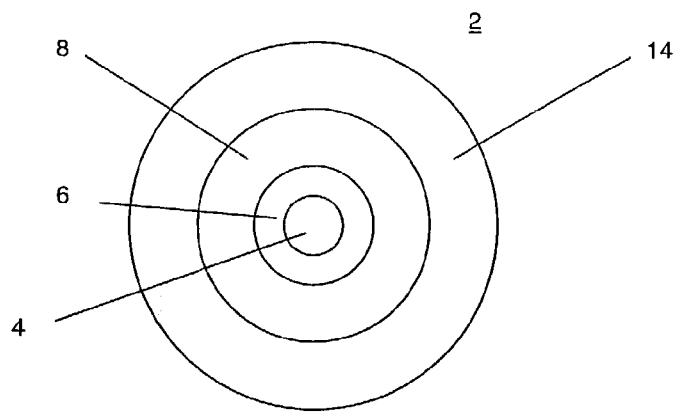
FIG. 1 is a schematic cross-sectional view of a preferred embodiment of an optical waveguide fiber in accordance with the present invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index, and is calculated at the point at which the relative index is most negative unless otherwise specified. In cases where the refractive index of an annular region or a segment is greater than the average refractive index of the cladding region, the relative index percent is positive and the region can be said to be raised or to have a positive index. A "downdopant" is herein considered to be a dopant which has a propensity to lower the refractive index relative to pure undoped $SiO_2$. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero.

"Effective area" is defined as:

$$A_{eff}=2\pi(\int E^2 r\, dr)^2/(\int E^4 r\, dr),$$

where the integration limits are 0 to ∞, and E is the electric field associated with light propagated in the waveguide.

The term "α-profile" refers to a refractive index profile, expressed in terms of Δ(r) %, where r is radius, which follows the equation, $$\Delta(r)\%=\Delta(r_o)(1-[|r-r_o|/(r_1-r_o)]^\alpha),$$

where $r_o$ is the point at which Δ(r)% is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int E^2 r\, dr/\int [dE/dr]^2 r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Generally, the "physical" core of optical fiber comprises one or more segments which may be doped. The segments are physically identifiable portions of the core. At the same time, it should be understood that, optically speaking, the "optical" core is considered herein to be where about 99% of the propagated light travels within the optical fiber, wherein a portion of the propagated light could travel outside a physical core segment.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

FIG. 1 is a schematic representation (not to scale) of an optical waveguide fiber 2 in accordance with the present invention having a central region (or first core segment) 4, a first annular region (or second core segment) 6 adjacent and surrounding the central region 4, a second annular region (or third core segment) 8 adjacent and surrounding the first annular region 6, and an outer annular cladding region or cladding or clad layer 14 adjacent and surrounding the second annular region 8.

Figure 2:
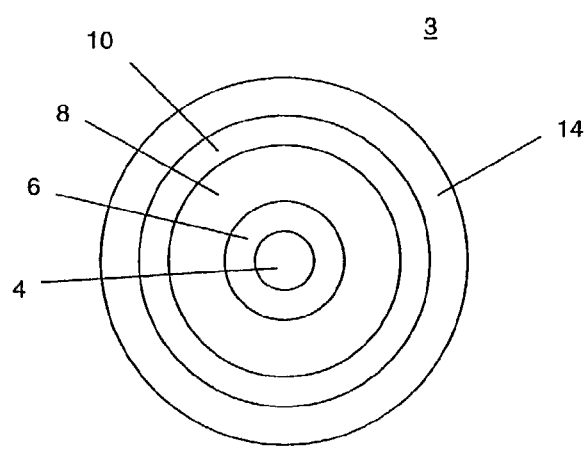
FIG. 2 is a schematic cross-sectional view of another preferred embodiment of an optical waveguide fiber in accordance with the present invention.

FIG. 2 is a schematic representation (not to scale) of a second optical waveguide fiber 3 in accordance with the present invention having a central region (or first core segment) 4, a first annular region (or second core segment) 6 adjacent and surrounding the central region 4, a second annular region (or third core segment) 8 adjacent and surrounding the first annular region 6, a third annular region (or fourth core segment) 10 adjacent and surrounding the second annular region 8, and an outer annular cladding region or cladding or clad layer 14 adjacent and surrounding the third annular region 10.

Preferably, the cladding 14 of the optical fiber disclosed herein is pure or substantially pure silica. More preferably, the cladding contains no germania or fluorine dopants therein. The outer annular cladding region 14 may be comprised of a cladding material which was deposited, for example during a laydown process, or which was provided in the form of a jacketing, such as a tube in a rod-in-tube optical preform arrangement, or a combination of deposited material and a jacket. The outer annular cladding region 14 may include one or more dopants. The cladding 14 is surrounded by a primary coating P and a secondary coating S. The refractive index of the cladding 14 is used to calculate the relative refractive index percentage as discussed elsewhere herein.

Referring to the Figures, the clad layer 14 has a refractive index of $n_c$ surrounding the core which is defined to have a $\Delta\%(r)=0$, which is used to calculate the refractive index percentage of the various portions or regions of an optical fiber or optical fiber preform.

In describing the profile of a region such as the central core region or core region, a half maximum point can be defined by determining a peak refractive index or maximum relative index, such as $\Delta_{1,MAX}$, and determining what radius corresponds to a relative refractive index which is equal to one-half the value of the peak refractive index or maximum relative index, such as $\Delta_{1,MAX}$, i.e. where a vertical line depending from the curve describing the relative refractive index versus radius intersects with the axis corresponding to $\Delta\%(r)=0$, i.e. the relative refractive index of the clad layer.

Figure 3:
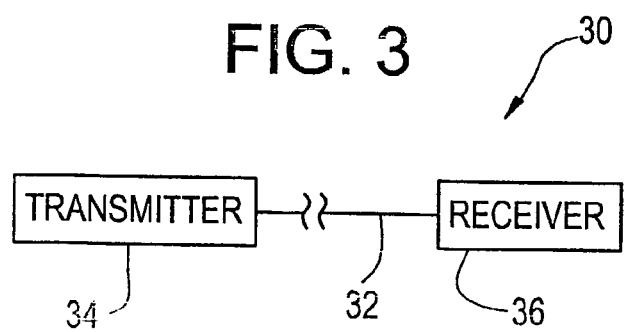
FIG. 3 is a schematic view of a fiber optic communication system employing an optical fiber of the present invention.

As shown in FIG. 3, an optical fiber 32 as disclosed herein may be implemented in an optical fiber communication system 30. System 30 includes a transmitter 34 and a receiver 36, wherein optical fiber 32 allows transmission of an optical signal between transmitter 34 and receiver 36. System 30 is preferably capable of 2-way communication, and transmitter 34 and receiver 36 are shown for illustration only. The system 30 preferably includes a link which has a section or a span of optical fiber as disclosed herein. The system 30 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially the 1383 nm window.

Methods of producing low water peak optical fiber can be found in U.S. application Ser. No. 09/722,804 filed Nov. 27, 2001, U.S. application Ser. No. 09/547,598 filed Apr. 11, 2000, U.S. Provisional Application Ser. No. 60/258,179 filed Dec. 22, 2000, and U.S. Provisional Application Ser. No. 60/275,015 filed Feb. 28, 2001, the contents of each being hereby incorporated by reference.

Figure 4:
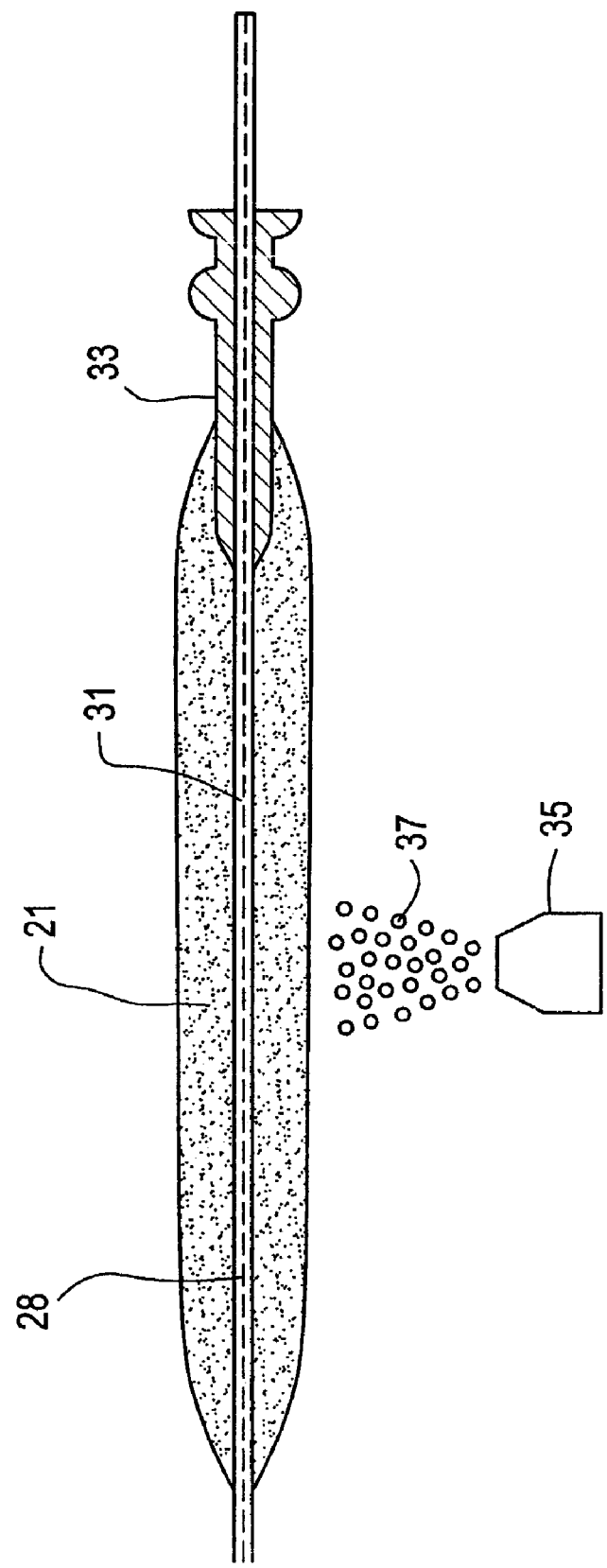
FIG. 4 is a schematic representation of laydown of a soot preform for forming into an optical waveguide fiber.

As exemplarily illustrated in FIG. 4, soot preform or soot body 21 is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process. Such an OVD process is illustrated in FIG. 4.

As shown in FIG. 4 a substrate or bait rod or mandrel 31 is inserted through a glass body such as hollow or tubular handle 33 and mounted on a lathe (not shown). The lathe is designed to rotate and translate mandrel 31 in close proximity with a soot-generating burner 35. As mandrel 31 is rotated and translated, silica-based reaction product 37, known generally as soot, is directed toward mandrel 31. At least a portion of silica-based reaction product 37 is deposited on mandrel 31 and on a portion of handle 33 to form a body 21 thereon.

Once the desired quantity of soot has been deposited on mandrel 31, soot deposition is terminated and mandrel 31 is removed from soot body 21.

Figure 5:
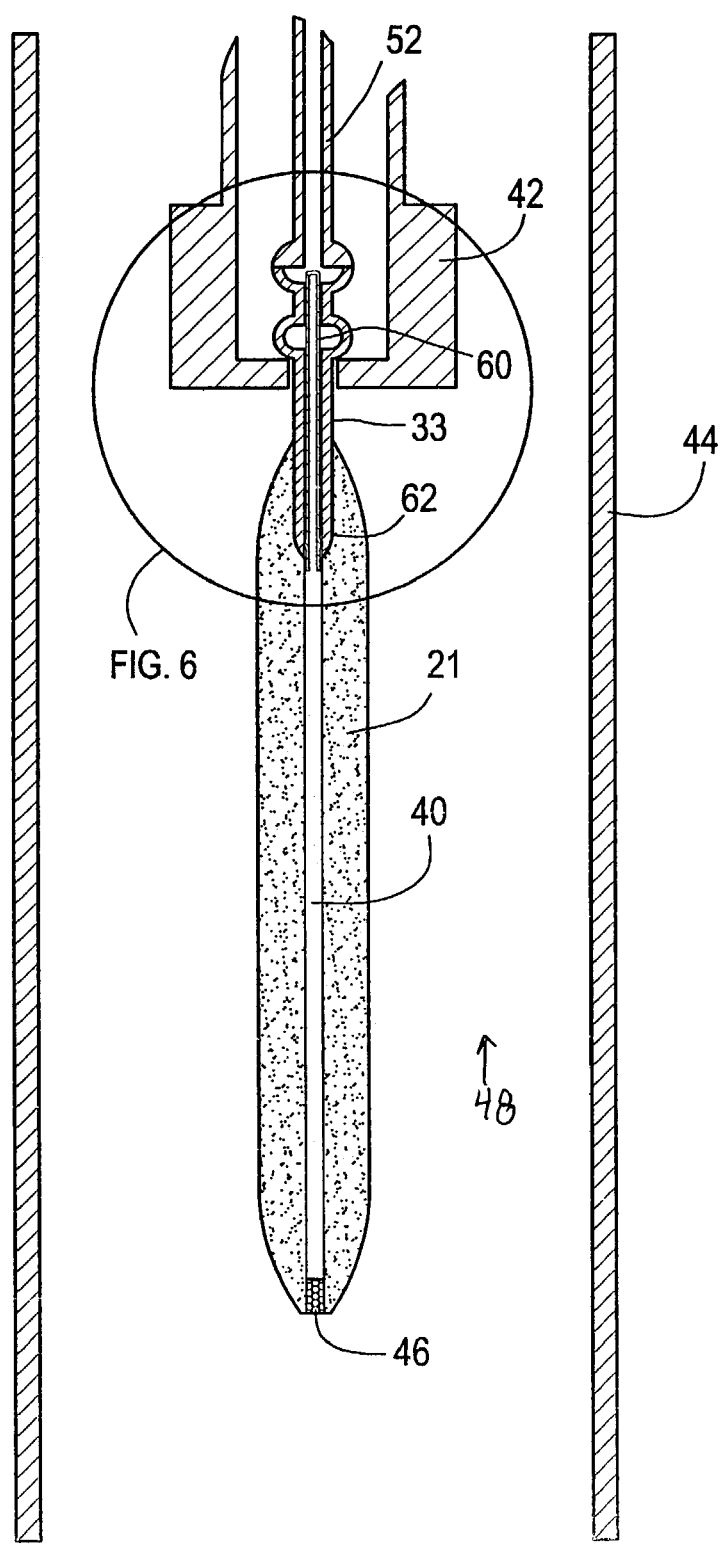
FIG. 5 is a schematic representation of an optical waveguide preform having both ends of its centerline hole plugged.
Figure 6:
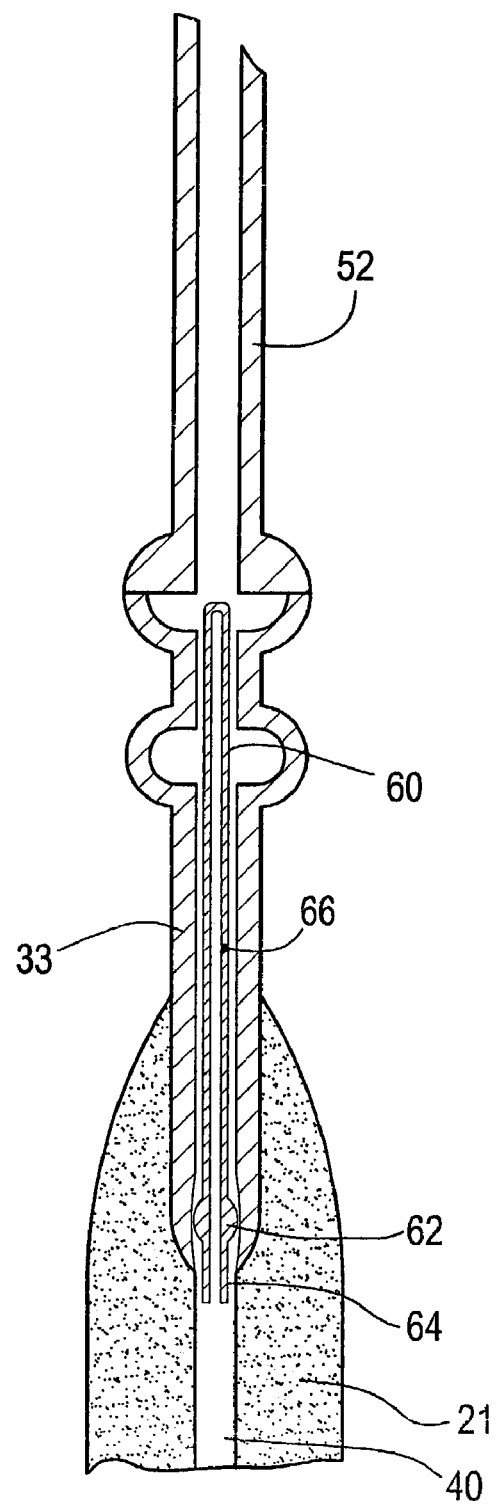
FIG. 6 is a closeup view of the plugged optical waveguide preform of FIG. 7 showing the top plug.

As depicted in FIGS. 5 and 6 upon removal of mandrel 31, soot body 21 defines a centerline hole 40 passing axially therethrough. Preferably, soot body 21 is suspended by handle 33 on a downfeed device 42 and positioned within a consolidation furnace 44. The end of centerline hole 40 remote from handle 33 is preferably fitted with a bottom plug 46 prior to positioning soot body 21 within consolidation furnace 44. Preferably, bottom plug 46 is positioned and held in place with respect to soot body 21 by friction fit. Plug 46 is further preferably tapered to facilitate entry and to allow at least temporary affixing, and at least loosely, within the soot body 21.

Soot body 21 is preferably chemically dried, for example, by exposing soot body 21 to a chlorine-containing atmosphere at elevated temperature within consolidation furnace 44. Chlorine-containing atmosphere 48 effectively removes water and other impurities from soot body 21, which otherwise would have an undesirable effect on the properties of optical waveguide fiber manufactured from soot body 21. In an OVD formed soot body 21, the chlorine flows sufficiently through the soot to effectively dry the entire blank, including the centerline region surrounding centerline hole 40.

Following the chemical drying step, the temperature of the furnace is elevated to a temperature sufficient to consolidate the soot blank into a sintered glass preform, preferably about 1500° C. The centerline hole 40 is then closed during the consolidation step so that the centerline hole does not have an opportunity to be rewet by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

In a preferred embodiment illustrated in FIG. 6, a glass body such as bottom plug 46 is positioned in centerline hole 40 at the end of soot body 21 remote from handle 33, and a glass body such as hollow tubular glass plug or top plug 60 having a open end 64 is positioned in centerline hole 40 in soot body 21 opposite plug 46 as shown in FIG. 5. Top plug 60 is shown disposed within the cavity of tubular handle 33. Following chlorine drying, soot body 21 is down driven into the hot zone of consolidation furnace 44 to seal centerline hole 40 and consolidate soot body 21 into a sintered glass preform or consolidated glass preform. Drying and consolidation may optionally occur simultaneously. During consolidation, soot body 21 contracts somewhat and engages bottom plug 46 and the lower end of top plug 60, thereby fusing the resulting sintered glass preform to plug 46 and plug 60 and sealing the centerline hole 40. Sealing of both the top and bottom of centerline hole 40 can be accomplished with one pass of soot body 21 through the hot zone. Preferably, the consolidated glass preform or sintered glass preform is held at an elevated temperature, preferably in a holding oven, to allow inert gas to diffuse from centerline hole 40 to form a passive vacuum within sealed centerline hole 40. Preferably, top plug 60 has a relatively thin wall through which diffusion of the inert gas can more expediently occur. As depicted in FIG. 6 top plug 60 preferably has an enlarged portion 62 for supporting plug 60 within handle 33, and a narrow portion 64 extending into centerline hole 40 of soot body 21. Plug 60 also preferably includes an elongated hollow portion 66 which may preferably occupy a substantial portion of handle 33. Hollow portion 66 provides additional volume to centerline hole 40 thereby providing a better vacuum within centerline hole 40 following diffusion of the inert gas.

The volume provided by elongated portion 66 of plug 60 provides added volume to sealed centerline hole 40, advantages of which will be described in greater detail below.

As described above and elsewhere herein, bottom plug 46 and top plug 60 are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Figure 7:
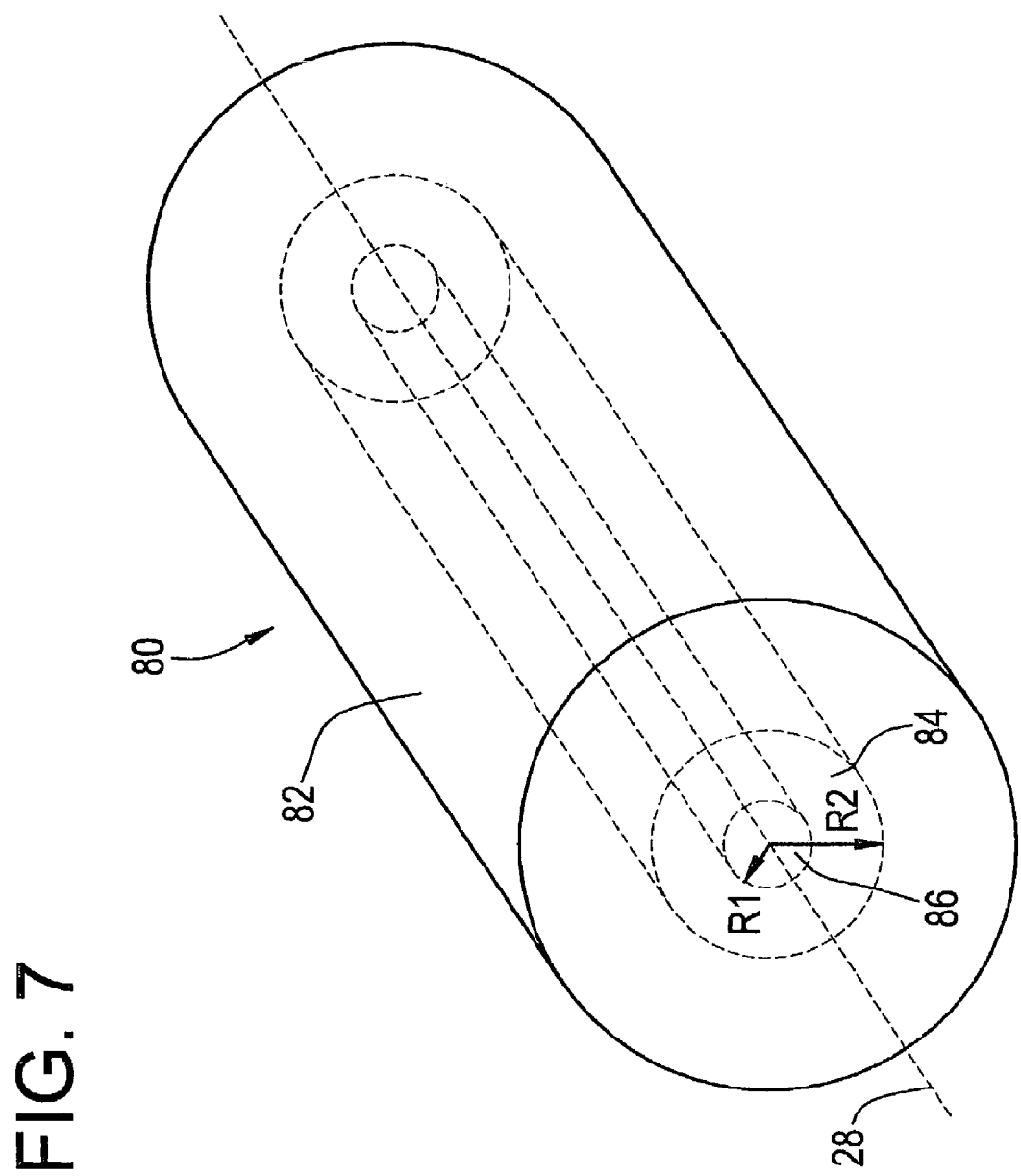
FIG. 7 is a schematic representation of an optical waveguide preform, or in the alternative an optical fiber, having a closed centerline region.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. FIG. 7 shows a representative isometric section of an optical fiber 80 having a centerline axis 28, a core portion 86 having a radius Ri, surrounded by an inner cladding portion 84 having a radius Rj, surrounded by an overcladding portion 82.

Consequently, overall lower O—H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nmn would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation.

The fibers disclosed herein exhibit low PMD values when fabricated with OVD processes. Methods and apparatus for achieving low polarization mode dispersion (PMD) in an optical fiber or fiber section can be found in U.S. Provisional Application Ser. No. 60/309,160 filed Jul. 31, 2001 and in PCT/US00/10303 filed Apr. 17, 2000, and additional methods and apparatus relating to the centerline aperture region of a preform can be found in U.S. application Ser. No. 09/558,770, filed Apr. 26, 2000, entitled "An Optical Fiber and a Method for Fabricating a Low Polarization-Mode Dispersion and Low Attenuation Optical Fiber", and in U.S. Provisional Application No. 60/131,033, filed Apr. 26, 1999, entitled "Low Water Peak Optical Waveguide and Method of Manufacturing Same", all of which are incorporated herein by reference. Spinning of the optical fiber may also lower PMD values for the fiber disclosed herein.

Figure 8:
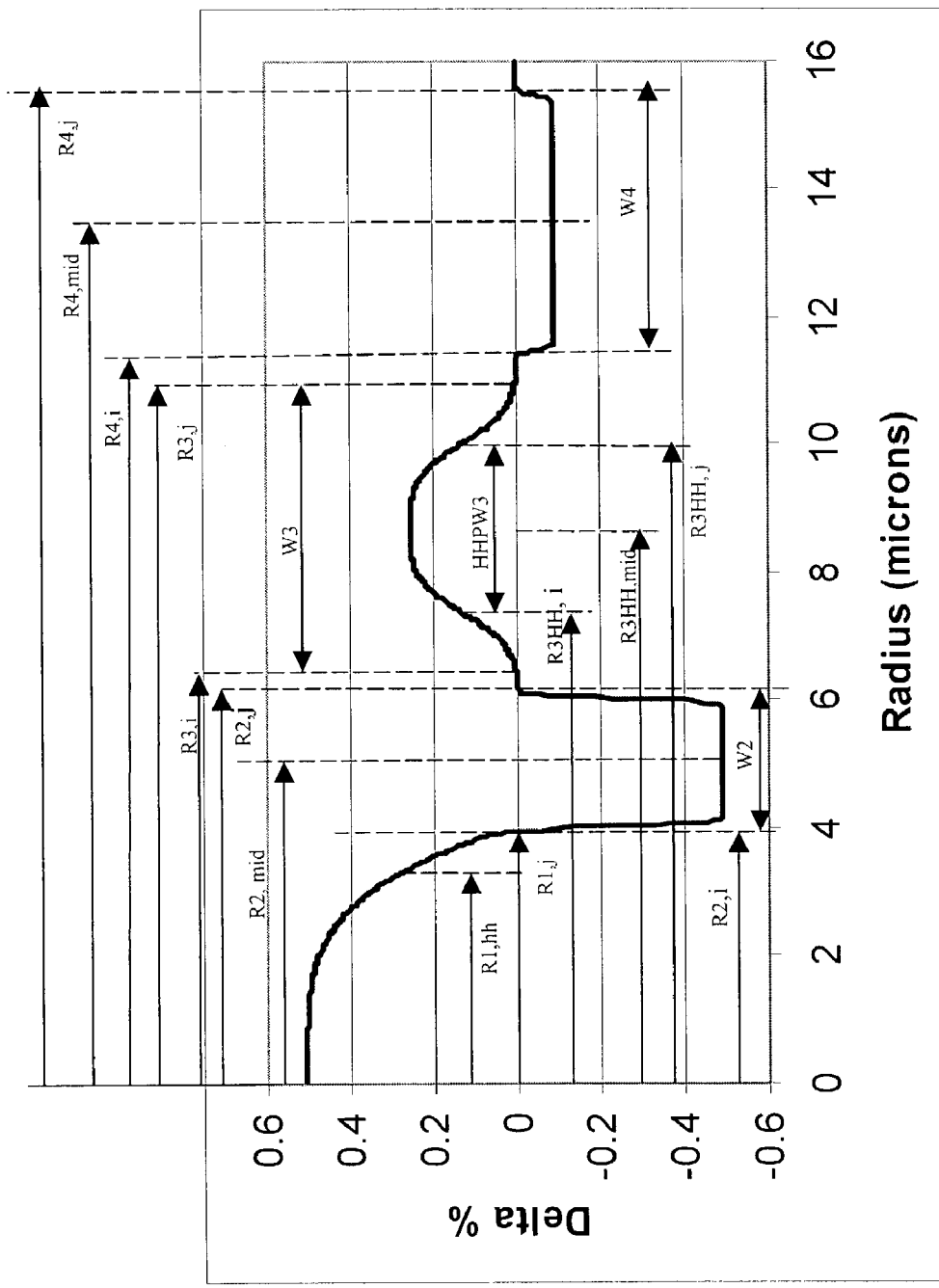
FIG. 8 shows a refractive index profile corresponding to a preferred embodiment of an optical waveguide fiber as disclosed herein.

Referring to FIG. 8, the optical waveguide fiber disclosed herein preferably comprises: a central region 4 extending radially outward from the centerline to a central region outer radius, $R1_j$, and having a positive relative refractive index percent, $\Delta_1\%(r)$ with a maximum relative refractive index percent, $\Delta_{1,MAX}$; a first annular region (or "moat") 6 and surrounding the central region 4, having a moat width $W_2$ disposed at a moat midpoint $R_{2mid}$, and having a negative relative refractive index percent, $\Delta_2\%(r)$, with a minimum relative refractive index percent, $\Delta_{2,MIN}$; a second annular region (or ring) 8 surrounding the first annular region 6, having a ring width $W_3$ disposed at a ring midpoint $R_{3mid}$, and having a positive relative refractive index percent, $\Delta_3\%(r)$ with a maximum relative refractive index percent, $\Delta_{3,MAX}$; and an outer annular cladding region 14 surrounding the second annular region 8 and having a relative refractive index percent, $\Delta_c\%(r)$. Preferably, $\Delta_{1,MAX} > \Delta_{3,MAX} > \Delta_{2,MIN}$ and $\Delta_2\%(r)$ is negative.

The central region 4 extends from the centerline of the fiber ($R_{1i}$=0) to the central region outer radius, $R_{1j}$ (where $\Delta\%(r)$ reaches 0%). $R_{1hh}$ marks the radius of the half-height, or half-peak height, of $\Delta_{1,MAX}$.

The moat 6 extends from the moat inner radius $R_2$ (where $\Delta\%(r)$ becomes negative) to the moat outer radius $R_{2j}$ (where $\Delta\%(r)$ reaches 0%). The moat width $W_2$ is defined as the radial distance between $R_{2i}$ and $R_{2j}$. The moat midpoint $R_{2mid}$ occurs in the middle of $R_{2i}$ and $R_{2j}$.

Preferably, the first annular region 6 is adjacent the central region 4, that is, preferably $R_{1j}=R_{2i}$.

The ring 8 extends from the ring inner radius $R_{3i}$ (where $\Delta\%(r)$ becomes positive) to the ring outer radius $R_{3j}$ (where $\Delta\%(r)$ reaches 0%). The ring width $W_3$ is defined as the radial distance between $R_{3i}$ and $R_{3j}$. The ring 8 has a positive relative refractive index profile with a "peak" or a maximum relative refractive index percent, $\Delta_{3,MAX}$. $R_{3hhi}$ marks the first radially inward occurrence of the half-height of $\Delta_{3,MAX}$. $R_{3hhj}$ marks the first radially outward occurrence of the half-height of $\Delta_{3,MAX}$. The ring half-height peak width $HHPW_3$ is bounded by inner and outer radii, $R_{3hhi}$ and $R_{3hhj}$, respectively. The midpoint of the ring half-height peak width $HHPW_3$ occurs at a radius $R_{3hhmid}$ which is half the radial distance between $R_{3hhi}$ and $R_{3hhj}$. Preferably, $\Delta_{3,MAX}$ occurs at $R_{3hhmid}$. Preferably, $R_{3hhmid}$ coincides with the middle of the ring 8.

In some preferred embodiments, the second annular region 8 is adjacent the first annular region 6, that is, $R_{2j}=R_{3i}$.

In some preferred embodiments, the optical waveguide fiber includes a third annular region (or gutter) 10 which surrounds the second annular region 8 and is disposed between the second annular region 8 and the outer annular cladding region 14. The third annular region 10 has a negative relative refractive index percent, $\Delta_4\%(r)$ with a minimum relative refractive index percent, $\Delta_{4,MIN}$.

The gutter 10 extends from the gutter inner radius $R_{4i}$ (where $\Delta\%(r)$ becomes negative) to the gutter outer radius $R_{4j}$ (where $\Delta\%(r)$ reaches 0%). The gutter width $W_4$ is defined as the radial distance between $R_{4i}$ and $R_{4j}$. The gutter width $W_4$ is defined as the radial distance between $R_{4i}$ and $R_{4j}$. The midpoint of the gutter $R_{4mid}$ occurs in the middle of $R_{4i}$ and $R_{4j}$. The relative refractive index percent, $\Delta_4\%(r)$ for $r > R_{4j}$ is preferably 0%.

In some preferred embodiments, the third annular region 10 is adjacent the second annular region 8, that is, $R_{3j}=R_{4i}$.

The profile volume of the optical fiber, or any portion thereof, is defined by:

$$\int_{r_o}^{r_f} \Delta(r) r \, dr$$

wherein $r_o$ and $r_f$ are the radii at the beginning and the end, respectively, of the portion of the fiber for which a profile volume is calculated.

The above-described definitions physical parameters apply to the remaining Figures where appropriate.

Diffusion of dopant during manufacturing of optical waveguide fiber may cause rounding of the corners of the profiles disclosed herein and may cause a centerline refractive index depression which may occupy a region of up to about 0.5 μm. It is possible, but often not necessary, to compensate somewhat for such diffusion, for example, in the doping step.

The central region profile volume, or "central region volume", is calculated from $R_{1i}$ to $R_{1j}$. The moat profile volume, or "moat volume", is calculated from $R_{2i}$ to $R_{2j}$. The ring profile volume, or "ring volume", is calculated from $R_{3i}$ to $R_{3j}$. The gutter profile volume, or "gutter volume", is calculated from $R_{4i}$ to $R_{4j}$. The total profile volume is calculated from $R_{1j}$ to the outermost diameter of the fiber, wherein, by definition, any portion of the fiber having a relative refractive index $\Delta\%(r)=0\%$ has a zero contribution to the profile volume. The tables below which list the physical properties of the fibers disclosed herein include the calculated profile volumes in %-μm$^2$ for the portions corresponding to the central core region, the moat, the ring, and the gutter, if any, and as well as the total profile volume thereof. Dispersion is given in units of ps/nm/km. Dispersion slope, or "slope" is given in ps/nm$^2$/km.

EXAMPLES 1 THROUGH 5

Figure 9:
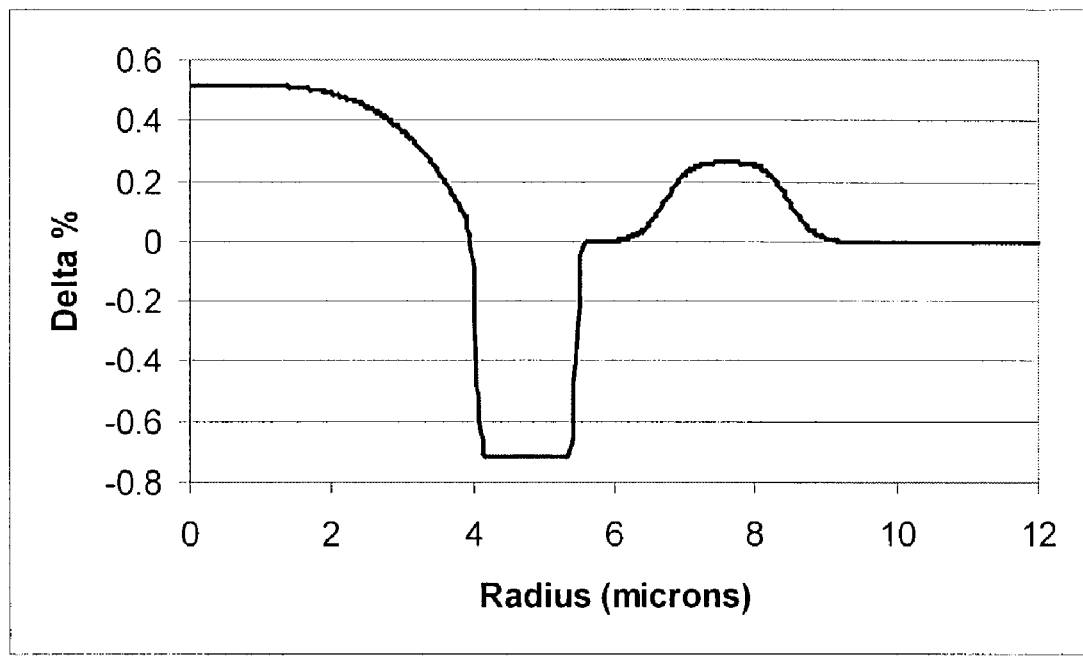
FIG. 9 shows a refractive index profile corresponding to another preferred embodiment of an optical waveguide fiber as disclosed herein.

Table 1 lists the physical parameters of first through fifth embodiments (Examples 1–5) of the optical fiber disclosed herein. The relative refractive index profiles of Examples 1–4 are generally represented by the profile of Example 3 shown in FIG. 8, with the corresponding entries for the physical parameters of a particular profile being found in Table 1. Example 5 is shown in FIG. 9, taken in conjunction with the corresponding entries in Table 1. Table 2 lists the optical properties of Examples 1–5.

TABLE 1

| | Example | | | | |
|---|---|---|---|---|---|
| | 1 | 2 | 3 | 4 | 5 |
| $\Delta_{1,MAX}$ | 0.505 | 0.504 | 0.508 | 0.512 | 0.519 |
| $R_{1J}$ | 3.96 | 3.96 | 3.96 | 3.96 | 3.96 |
| $R_{1,HH}$ | 3.4 | 3.4 | 3.4 | 3.4 | 3.4 |
| $\Delta_{2,MIN}$ | −0.45 | −0.467 | −0.49 | −0.595 | −0.713 |
| $R_{2I}$ | 3.96 | 3.96 | 3.96 | 3.96 | 3.96 |
| $R_{2J}$ | 6 | 6.05 | 6.15 | 5.8 | 5.6 |
| W2 | 2.04 | 2.09 | 2.19 | 1.84 | 1.64 |
| R2mid | 5.0 | 5.0 | 5.1 | 4.9 | 4.8 |
| $\Delta_{3,MAX}$ | 0.154 | 0.19 | 0.255 | 0.25 | 0.262 |
| R3i | 6.5 | 6.5 | 6.65 | 6.4 | 6.65 |
| R3j | 13.1 | 11.85 | 10.75 | 9.45 | 9 |
| $R_{3HHi}$ | 7.6 | 7.4 | 7.4 | 7.05 | 6.7 |
| $R_{3HHJ}$ | 12 | 11 | 10 | 9.35 | 8.5 |
| $R_{3HHMID}$ | 9.8 | 9.2 | 8.7 | 8.2 | 7.6 |
| $R_{4i}$ | 14 | 12.9 | 11.3 | 10.4 | 9 |
| $HHPW_3$ | 8 | 6.9 | 5.15 | 4.6 | 3.4 |
| $\Delta_{4,MIN}$ | −0.22 | −0.15 | −0.09 | −0.05 | 0 |
| $R_{4J}$ | 18.3 | 17.1 | 15.6 | 13.7 | |
| W4 | 4.3 | 4.2 | 4.3 | 3.3 | |
| R4mid | 16.2 | 15 | 13.5 | 12.1 | |
| Central Region Vol. | 2.75 | 2.75 | 2.77 | 2.8 | 2.84 |
| Moat Volume | −4.1 | −4.4 | −4.91 | −4.75 | −4.81 |
| Ring Volume | 6.74 | 6.22 | 5.92 | 4.74 | 3.54 |
| Gutter Volume | −14.2 | −8.97 | −4.84 | −1.81 | 0 |
| Total Profile Volume | −8.8 | −4.4 | −1.1 | 1.0 | 1.6 |

TABLE 2

| | Example | | | | |
|---|---|---|---|---|---|
| | 1 | 2 | 3 | 4 | 5 |
| Dispersion @ 1310 nm | −1.2 | −1.4 | −1.1 | −1.2 | −1.3 |
| Dispersion @ 1400 nm | 3.4 | 3.1 | 3.3 | 3.2 | 3.4 |
| Dispersion @ 1530 nm | 6.5 | 6 | 6.2 | 6.1 | 6.45 |
| Dispersion @ 1550 nm | 6.7 | 6.2 | 6.4 | 6.3 | 6.4 |
| Dispersion @ 1625 nm | 6.9 | 6.4 | 6.7 | 6.5 | 6.8 |
| Slope @ 1550 nm | 0.0067 | 0.0067 | 0.0071 | 0.0069 | 0.0073 |
| Slope @ 1400 nm | 0.039 | 0.037 | 0.037 | 0.037 | 0.038 |
| Lambda Zero | 1313 | 1316 | 1310 | 1314 | 1308 |
| Aeff @ 1550 nm | 47.1 | 47.4 | 47.3 | 45.9 | 44.2 |
| MFD @ 1550 nm | 7.7 | 7.7 | 7.65 | 7.6 | 7.5 |
| MFD @ 1310 nm | 6.7 | 6.7 | 6.7 | 6.6 | 6.5 |
| Pin Array @ 1550 nm | 9.6 | 11.2 | 11.4 | 11.2 | 11.1 |
| Lateral Load @ 1550 nm | 0.76 | 0.83 | 0.85 | 0.71 | 0.54 |
| Attenuation @ 1550 nm | 0.206 | 0.207 | 0.207 | 0.210 | 0.212 |
| LP02 Cutoff | 1603 | 1584 | 1605 | 1596 | 1601 |
| Cabled Cutoff | 1203 | 1184 | 1205 | 1196 | 1201 |
| LP01 Cutoff | 2767 | 2913 | 3500 | 4881 | 5000 |
| Kappa @ 1550 nm | 1000 | 925 | 901 | 913 | 877 |

EXAMPLES 6 THROUGH 10

Figure 10:
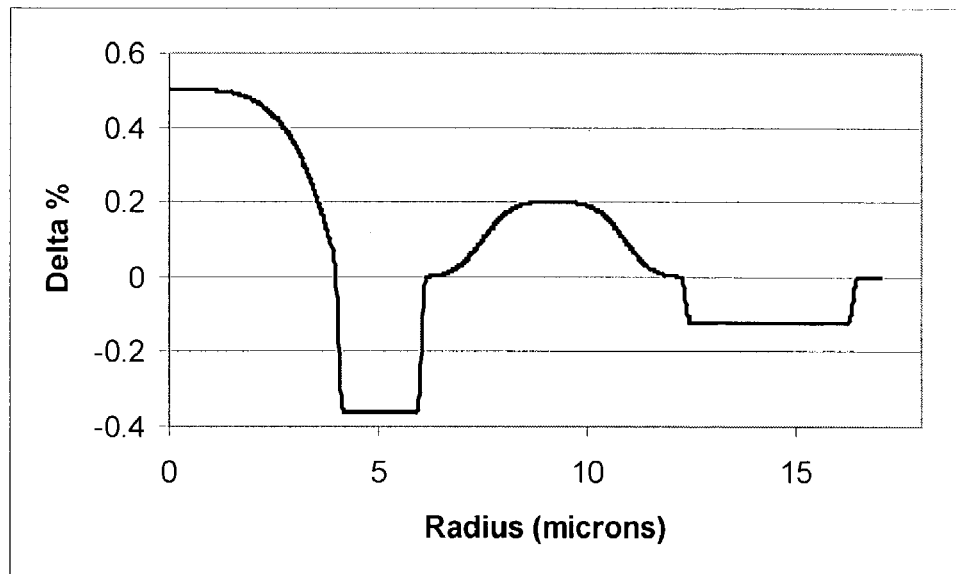
FIG. 10 shows a refractive index profile corresponding to another preferred embodiment of an optical waveguide fiber as disclosed herein.
Figure 11:
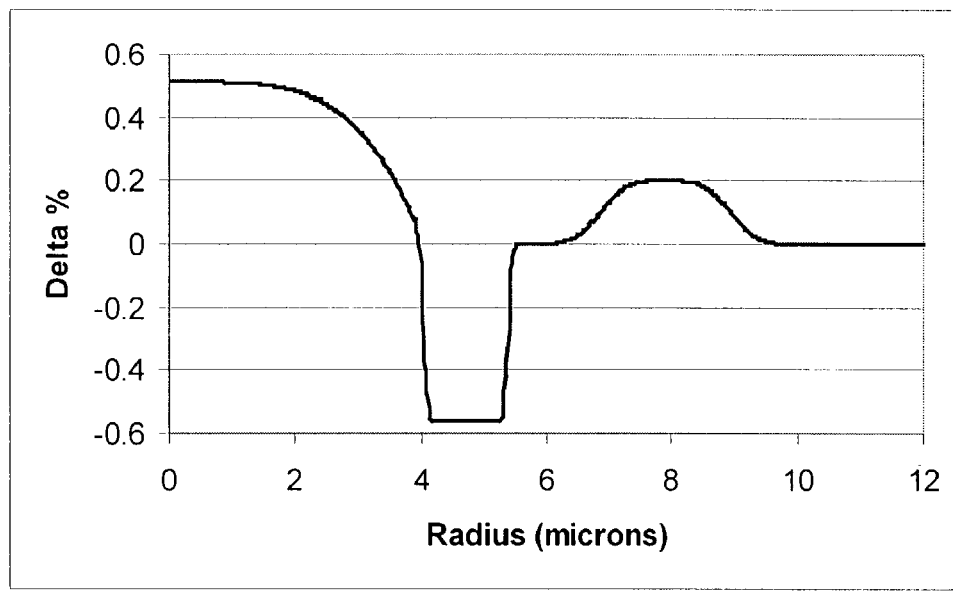
FIG. 11 shows a refractive index profile corresponding to another preferred embodiment of an optical waveguide fiber as disclosed herein.

Table 3 lists the physical parameters of sixth through tenth embodiments (Examples 6–10) of the optical fiber disclosed herein. The relative refractive index profiles of Examples 6–9 are generally represented by the profile of Example 8 shown in FIG. 10, with the corresponding entries for the physical parameters of a particular profile being found in Table 3. Example 10 is shown in FIG. 11, taken in conjunction with the corresponding entries in Table 3. Table 4 lists the optical properties of Examples 6–10.

TABLE 3

| | Example | | | | |
|---|---|---|---|---|---|
| | 6 | 7 | 8 | 9 | 10 |
| $\Delta_{1,MAX}$ | 0.501 | 0.502 | 0.502 | 0.506 | 0.513 |
| $R_{1J}$ | 3.95 | 3.95 | 3.95 | 3.95 | 3.95 |
| $R_{1,HH}$ | 3.4 | 3.4 | 3.4 | 3.4 | 3.4 |
| $\Delta_{2,MIN}$ | −0.35 | −0.35 | −0.36 | −0.42 | −0.56 |
| $R_{2I}$ | 3.95 | 3.95 | 3.95 | 3.95 | 3.95 |
| $R_{2J}$ | 6 | 6.25 | 6.05 | 5.95 | 5.5 |
| W2 | 2.1 | 2.3 | 2.1 | 2 | 1.6 |
| R2mid | 5.0 | 5.1 | 5.0 | 5.0 | 4.7 |

TABLE 3-continued

| | Example | | | | |
|---|---|---|---|---|---|
| | 6 | 7 | 8 | 9 | 10 |
| $\Delta_{3,MAX}$ | 0.15 | 0.2 | 0.2 | 0.2 | 0.2 |
| R3i | 6.55 | 6.65 | 6.65 | 6.4 | 6.3 |
| R3j | 13.05 | 12.15 | 11.75 | 11 | 9.5 |
| $R_{3HHi}$ | 7.6 | 7.6 | 7.5 | 7.2 | 6.9 |
| $R_{3HHJ}$ | 12 | 11.2 | 10.9 | 10.2 | 8.9 |
| $R_{3HHMID}$ | 9.8 | 9.4 | 9.2 | 8.7 | 7.9 |
| $R_{4i}$ | 14.3 | 12.7 | 12.3 | 11.7 | 9.5 |
| $HHPW_3$ | 8.3 | 6.45 | 6.25 | 5.75 | 4 |
| $\Delta_{4,MIN}$ | −0.22 | −0.18 | −0.12 | −0.12 | 0 |
| $R_{4J}$ | 18.5 | 16.9 | 16.5 | 13.9 | |
| W4 | 4.2 | 4.2 | 4.2 | 2.2 | |
| R4mid | 16.4 | 14.8 | 14.4 | 12.8 | |
| Central Region Vol. | 2.73 | 2.73 | 2.73 | 2.76 | 2.8 |
| Moat Volume | −3.19 | −3.72 | −3.61 | −3.71 | −3.55 |
| Ring Volume | 6.65 | 6.85 | 6.25 | 5.26 | 3.3 |
| Gutter Volume | −14.4 | −10.62 | −6.89 | −3.07 | 0 |
| Total Profile Volume | −8.21 | −4.76 | −1.52 | 1.24 | 2.55 |

TABLE 4

| | Example | | | | |
|---|---|---|---|---|---|
| | 6 | 7 | 8 | 9 | 10 |
| Dispersion @ 1310 nm | −2.4 | −2.37 | −2.33 | −2.26 | −2.34 |
| Dispersion @ 1400 nm | 2.3 | 2.42 | 2.27 | 2.33 | 2.25 |
| Dispersion @ 1530 nm | 6 | 6 | 5.8 | 6 | 6 |
| Dispersion @ 1550 nm | 6.3 | 6.28 | 6.23 | 6.39 | 6.38 |
| Dispersion @ 1625 nm | 7.4 | 7.5 | 7.4 | 7.6 | 7.5 |
| Slope @ 1550 nm | 0.016 | 0.016 | 0.017 | 0.017 | 0.017 |
| Slope @ 1400 nm | 0.041 | 0.040 | 0.040 | 0.040 | 0.041 |
| Lambda Zero | 1344 | 1340 | 1343 | 1342 | 1345 |
| Aeff @ 1550 nm | 49.9 | 49.7 | 49.8 | 48.7 | 47.3 |
| MFD @ 1550 nm | 8 | 7.95 | 7.95 | 7.86 | 7.74 |
| MFD @ 1310 nm | 6.9 | 6.85 | 6.85 | 6.8 | 6.7 |
| Pin Array @ 1550 nm | 7.9 | 8.5 | 9.1 | 9.6 | 9.6 |
| Lateral Load @ 1550 nm | 0.71 | 0.75 | 0.77 | 0.67 | 0.5 |
| Attenuation @ 1550 nm | 0.204 | 0.204 | 0.205 | 0.206 | 0.209 |
| LP02 Cutoff | 1607 | 1606 | 1604 | 1593 | 1602 |
| Cabled Cutoff | 1207 | 1206 | 1204 | 1193 | 1202 |
| LP01 Cutoff | 3050 | 3123 | 3744 | 5000 | 5000 |
| Kappa @ 1550 nm | 394 | 393 | 366 | 376 | 375 |

EXAMPLES 11 THROUGH 15

Figure 12:
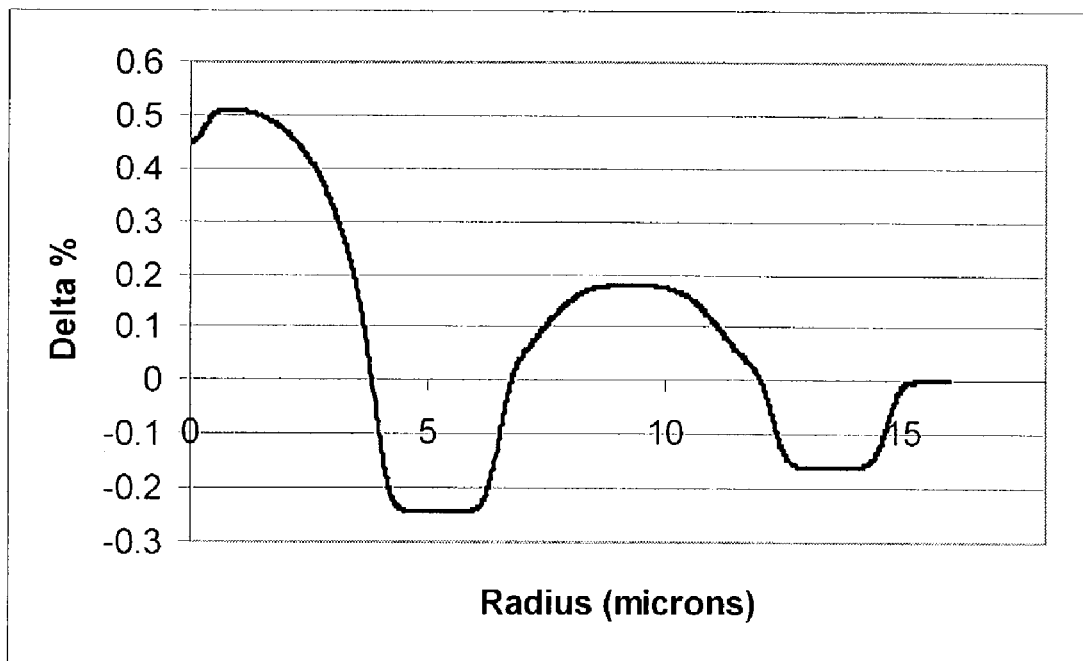
FIG. 12 shows a refractive index profile corresponding to another preferred embodiment of an optical waveguide fiber as disclosed herein.
Figure 13:
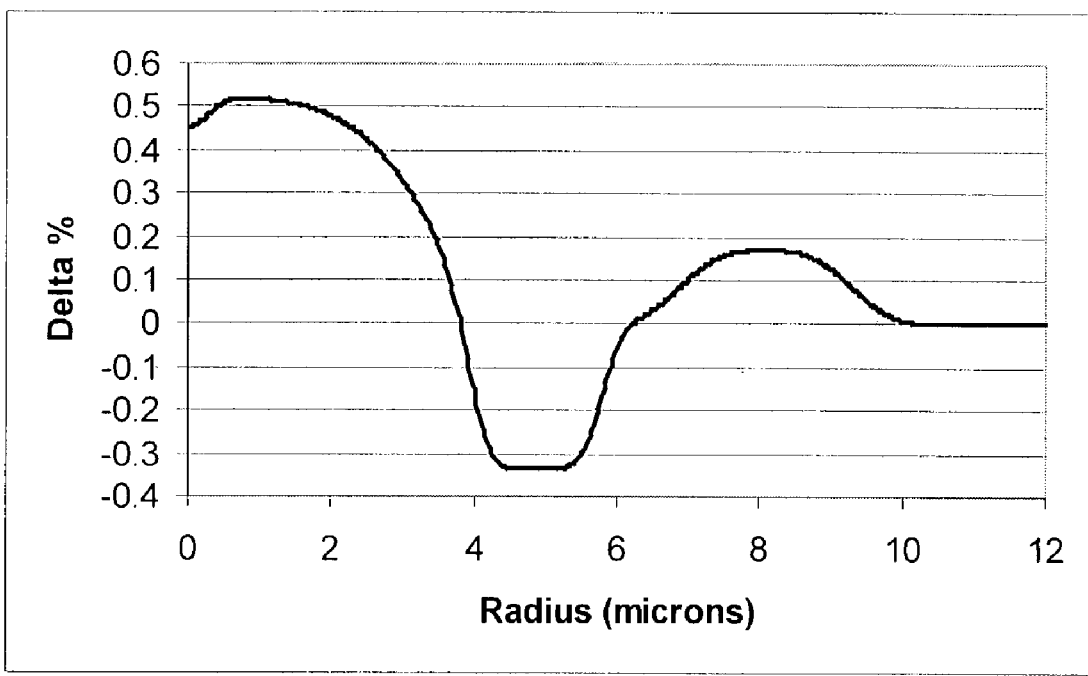
FIG. 13 shows a refractive index profile corresponding to another preferred embodiment of an optical waveguide fiber as disclosed herein.

Table 5 lists the physical parameters of eleventh through fifteenth embodiments (Examples 11–15) of the optical fiber disclosed herein. The relative refractive index profiles of Examples 11–14 are generally represented by the profile of Example 13 shown in FIG. 12, with the corresponding entries for the physical parameters of a particular profile being found in Table 5. Example 15 is shown in FIG. 13, taken in conjunction with the corresponding entries in Table 5. Table 6 lists the optical properties of Examples 11–15.

EXAMPLES 16 THROUGH 20

Figure 14:
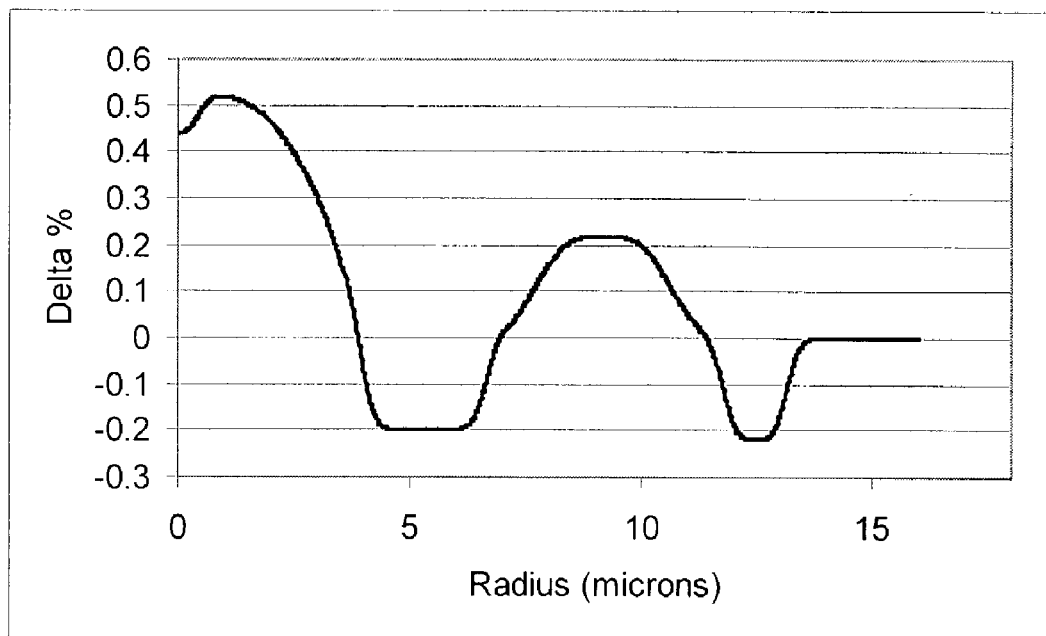
FIG. 14 shows a refractive index profile corresponding to another preferred embodiment of an optical waveguide fiber as disclosed herein.
Figure 15:
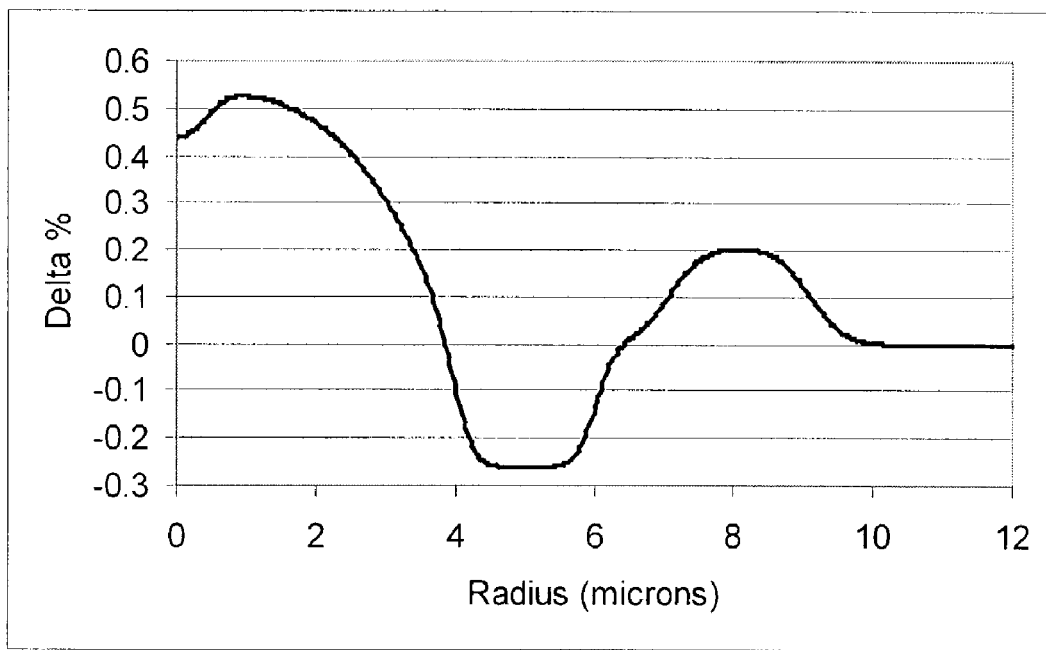
FIG. 15 shows a refractive index profile corresponding to another preferred embodiment of an optical waveguide fiber as disclosed herein.

Table 7 lists the physical parameters of sixteenth through twentieth embodiments (Examples 16–20) of the optical fiber disclosed herein. The relative refractive index profiles of Examples 16–19 are generally represented by the profile of Example 18 shown in FIG. 14, with the corresponding entries for the physical parameters of a particular profile being found in Table 7. Example 20 is shown in FIG. 15, taken in conjunction with the corresponding entries in Table 7. Table 8 lists the optical properties of Examples 16–20.

TABLE 5

| | Example | | | | |
|---|---|---|---|---|---|
| | 11 | 12 | 13 | 14 | 15 |
| $\Delta_{1,MAX}$ | 0.51 | 0.51 | 0.51 | 0.513 | 0.519 |
| $R_{1J}$ | 3.8 | 3.83 | 3.83 | 3.83 | 3.8 |
| $R_{1,HH}$ | 3.25 | 3.25 | 3.27 | 3.27 | 3.27 |
| $\Delta_{2,MIN}$ | −0.212 | −0.23 | −0.243 | −0.263 | −0.34 |
| $R_{2I}$ | 3.8 | 3.83 | 3.83 | 3.83 | 3.8 |
| $R_{2J}$ | 6.2 | 6.6 | 6.75 | 6.83 | 6.78 |
| W2 | 2.4 | 2.8 | 2.9 | 3 | 3.0 |
| R2mid | 5 | 5.2 | 5.3 | 5.3 | 5.3 |
| $\Delta_{3,MAX}$ | 0.135 | 0.18 | 0.18 | 0.18 | 0.17 |
| R3i | 6.8 | 6.9 | 6.8 | 6.65 | 6.3 |
| R3j | 13.15 | 12.25 | 11.95 | 11.55 | 10 |
| $R_{3HHi}$ | 7.1 | 7.6 | 7.4 | 7.3 | 6.9 |
| $R_{3HHJ}$ | 12.8 | 11.6 | 11.2 | 10.8 | 9.3 |
| $R_{3HHMID}$ | 9.9 | 9.6 | 9.3 | 9 | 8.1 |
| $R_{4i}$ | 13.2 | 12.4 | 12 | 11.7 | 10.2 |
| $HHPW_3$ | 7 | 5.8 | 5.25 | 4.9 | 3.4 |
| $\Delta_{4,MIN}$ | −0.22 | −0.21 | −0.16 | −0.16 | 0 |
| $R_{4J}$ | 16.6 | 15.6 | 15.2 | 14.1 | |
| W4 | 3.4 | 3.2 | 3.2 | 2.4 | |
| R4mid | 14.9 | 14 | 13.6 | 12.9 | |
| Central Region Vol. | 2.49 | 2.53 | 2.54 | 2.55 | 2.57 |
| Moat Volume | −2.81 | −3 | −3.06 | −3.03 | −2.89 |
| Ring Volume | 7.1 | 6.75 | 6.23 | 5.54 | 3.29 |
| Gutter Volume | −7.83 | −6.9 | −4.87 | −2.48 | 0 |
| Total Profile Volume | −1.05 | −0.62 | 0.84 | 2.58 | 2.97 |

TABLE 7

| | Example | | | | |
|---|---|---|---|---|---|
| | 16 | 17 | 18 | 19 | 20 |
| $\Delta_{1,MAX}$ | 0.518 | 0.518 | 0.52 | 0.522 | 0.526 |
| $R_{1J}$ | 3.88 | 3.88 | 3.88 | 3.88 | 3.88 |
| $R_{1,HH}$ | 3.18 | 3.18 | 3.18 | 3.18 | 3.18 |
| $\Delta_{2,MIN}$ | −0.18 | −0.185 | −0.199 | −0.22 | −0.26 |
| $R_{2I}$ | 3.88 | 3.88 | 3.88 | 3.88 | 3.88 |
| $R_{2J}$ | 7.26 | 7.14 | 6.98 | 6.73 | 6.43 |
| W2 | 3.38 | 3.26 | 3.1 | 2.85 | 2.55 |
| R2mid | 5.57 | 5.51 | 5.43 | 5.305 | 5.155 |
| $\Delta_{3,MAX}$ | 0.22 | 0.213 | 0.22 | 0.21 | 0.203 |
| $R_{3i}$ | 7.3 | 7.15 | 7.05 | 6.85 | 6.5 |
| $R_{3j}$ | 11.8 | 11.7 | 11.4 | 10.75 | 9.75 |
| $R_{3HHi}$ | 7.76 | 7.75 | 7.73 | 7.61 | 7.08 |
| $R_{3HHJ}$ | 11.42 | 11.03 | 10.66 | 10.03 | 9.11 |
| $R_{3HHMID}$ | 9.6 | 9.4 | 9.2 | 8.8 | 8.1 |
| $R_{4i}$ | 11.8 | 11.7 | 11.4 | 10.85 | 10.1 |
| $HHPW_3$ | 4.5 | 4.6 | 4.4 | 4.1 | 3.7 |
| $\Delta_{4,MIN}$ | −0.22 | −0.16 | −0.22 | −0.1 | 0 |
| $R_{4J}$ | 15 | 15 | 13.7 | 12.9 | |
| W4 | 3.2 | 3.3 | 2.3 | 2.1 | |
| R4mid | 13.4 | 13.4 | 12.6 | 11.9 | |
| Central Region Vol. | 2.48 | 2.47 | 2.48 | 2.49 | 2.51 |
| Moat Volume | −2.92 | −2.78 | −2.7 | −2.51 | −2.54 |
| Ring Volume | 7.27 | 6.41 | 5.86 | 4.57 | 3.35 |
| Gutter Volume | −7.37 | −5.43 | −3.79 | −1.64 | 0 |
| Total Profile Volume | −0.54 | 0.67 | 1.85 | 2.91 | 3.32 |

TABLE 6

| | Example | | | | |
|---|---|---|---|---|---|
| | 11 | 12 | 13 | 14 | 15 |
| Dispersion @ 1310 nm | −3.7 | −3.5 | −3.4 | −3.5 | −3.5 |
| Dispersion @ 1400 nm | 1.25 | 1.44 | 1.4 | 1.43 | 1.41 |
| Dispersion @ 1530 nm | 5.7 | 5.8 | 5.8 | 5.8 | 5.9 |
| Dispersion @ 1550 nm | 6.2 | 6.3 | 6.3 | 6.3 | 6.4 |
| Dispersion @ 1625 nm | 7.9 | 8.1 | 8 | 8.1 | 8.1 |
| Slope @ 1550 nm | 0.0243 | 0.0243 | 0.0244 | 0.0244 | 0.0247 |
| Slope @ 1400 nm | 0.045 | 0.044 | 0.044 | 0.044 | 0.045 |
| Lambda Zero | 1372 | 1367 | 1368 | 1368 | 1369 |
| Aeff @ 1550 nm | 51.1 | 51 | 50.8 | 50.2 | 48.8 |
| MFD @ 1550 nm | 8.15 | 8.1 | 8.1 | 8.05 | 7.95 |
| MFD @ 1310 nm | 7 | 6.95 | 6.95 | 6.9 | 6.8 |
| Pin Array @ 1550 nm | 10.2 | 9.7 | 10 | 9.9 | 10 |
| Lateral Load @ 1550 nm | 0.83 | 0.81 | 0.79 | 0.71 | 0.51 |
| Attenuation @ 1550 nm | 0.201 | 0.202 | 0.202 | 0.202 | 0.204 |
| LP02 Cutoff | 1596 | 1602 | 1596 | 1601 | 1598 |
| Cabled Cutoff | 1196 | 1202 | 1196 | 1201 | 1198 |
| LP01 Cutoff | 4116 | 4217 | 4960 | 5000 | 5000 |
| Kappa @ 1550 nm | 255 | 259 | 258 | 258 | 259 |

TABLE 8

| | Example | | | | |
|---|---|---|---|---|---|
| | 16 | 17 | 18 | 19 | 20 |
| Dispersion @ 1310 nm | −4.2 | −4.2 | −4.24 | −4.27 | −4.33 |
| Dispersion @ 1400 nm | 0.83 | 0.83 | 0.81 | 0.81 | 0.72 |
| Dispersion @ 1530 nm | 5.7 | 5.7 | 5.7 | 5.8 | 5.7 |
| Dispersion @ 1550 nm | 6.3 | 6.3 | 6.3 | 6.4 | 6.3 |
| Dispersion @ 1625 nm | 8.6 | 8.5 | 8.6 | 8.6 | 8.4 |
| Slope @ 1550 nm | 0.030 | 0.030 | 0.030 | 0.030 | 0.030 |
| Slope @ 1400 nm | 0.047 | 0.047 | 0.047 | 0.047 | 0.047 |
| Lambda Zero | 1382 | 1382 | 1383 | 1383 | 1385 |
| Aeff @ 1550 nm | 52.9 | 52.7 | 52.3 | 51.6 | 50.8 |
| MFD @ 1550 nm | 8.3 | 8.3 | 8.25 | 8.2 | 8.14 |
| MFD @ 1310 nm | 7.1 | 7.05 | 7 | 7 | 6.9 |
| Pin Array @ 1550 nm | 10.1 | 10.4 | 10.5 | 10.3 | 10.2 |
| Lateral Load @ 1550 nm | 0.93 | 0.89 | 0.84 | 0.7 | 0.6 |
| Attenuation @ 1550 nm | 0.2003 | 0.2003 | 0.2007 | 0.201 | 0.202 |
| LP02 Cutoff | 1609 | 1602 | 1605 | 1604 | 1598 |
| Cabled Cutoff | 1209 | 1202 | 1205 | 1204 | 1198 |
| LP01 Cutoff | 4308 | 5000 | 5000 | 5000 | 5000 |
| Kappa @ 1550 nm | 210 | 210 | 210 | 213 | 210 |

EXAMPLES 21 THROUGH 25

Figure 16:
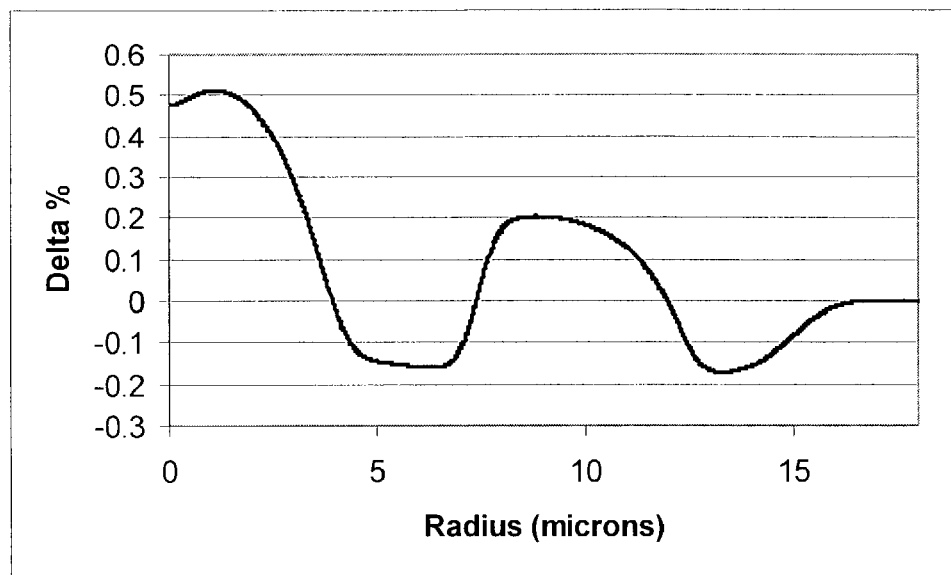
FIG. 16 shows a refractive index profile corresponding to another preferred embodiment of an optical waveguide fiber as disclosed herein.

Table 9 lists the physical parameters of twenty-first through twenty-fifth embodiments (Examples 21–25) of the optical fiber disclosed herein. The relative refractive index profiles of Examples 21–25 are generally represented by the profile of Example 24 shown in FIG. 16, with the corresponding entries for the physical parameters of a particular profile being found in Table 9. Table 10 lists the optical properties of Examples 21–25.

TABLE 9

| | Example | | | | |
|---|---|---|---|---|---|
| | 21 | 22 | 23 | 24 | 25 |
| $\Delta_{1,MAX}$ | 0.53 | 0.53 | 0.53 | 0.51 | 0.53 |
| $R_{1J}$ | 4 | 4 | 4 | 3.9 | 3.65 |
| $R_{1,HH}$ | 3.1 | 3.1 | 3.1 | 3.15 | 3.1 |
| $\Delta_{2,MIN}$ | −0.17 | −0.16 | −0.155 | −0.16 | −0.2 |
| $R_{2I}$ | 4 | 4 | 4 | 3.9 | 3.65 |
| $R_{2J}$ | 7.2 | 7.2 | 7.2 | 7.4 | 6.6 |
| W2 | 3.2 | 3.2 | 3.2 | 3.5 | 3.0 |
| R2mid | 5.6 | 5.6 | 5.6 | 5.7 | 5.1 |
| $\Delta_{3,MAX}$ | 0.215 | 0.2 | 0.19 | 0.2 | 0.25 |

TABLE 9-continued

| | Example | | | | |
|---|---|---|---|---|---|
| | 21 | 22 | 23 | 24 | 25 |
| R3i | 7.25 | 7.25 | 7.25 | 7.4 | 6.6 |
| R3j | 11.8 | 11.85 | 11.9 | 11.9 | 10.6 |
| $R_{3HHi}$ | 7.65 | 7.65 | 7.65 | 7.7 | 7.05 |
| $R_{3HHJ}$ | 11.35 | 11.35 | 11.35 | 11.3 | 10 |
| $R_{3HHMID}$ | 9.5 | 9.5 | 9.5 | 8.8 | 8.5 |
| $R_{4i}$ | 11.8 | 11.9 | 11.9 | 12 | 10.7 |
| $HHPW_3$ | 4.6 | 4.7 | 4.7 | 4.6 | 4.1 |
| $\Delta_{4,MIN}$ | −0.21 | −0.12 | −0.085 | −0.17 | −0.2 |
| $R_{4J}$ | 15.3 | 16.4 | 17.7 | 16.5 | 14.55 |
| W4 | 3.5 | 4.5 | 5.8 | 4.5 | |
| R4mid | 13.6 | 14.2 | 14.8 | 14.3 | |
| Central Region Vol. | 2.49 | 2.49 | 2.49 | 2.41 | 2.56 |
| Moat Volume | −2.67 | −2.51 | −2.43 | −2.48 | −2.24 |
| Ring Volume | 7.13 | 6.66 | 6.34 | 6.53 | 5.96 |
| Gutter Volume | −7.05 | −6.36 | −6.3 | −6.07 | −8.59 |
| Total Profile Volume | −0.1 | 0.3 | 0.1 | 0.4 | −2.3 |

TABLE 10

| | Example | | | | |
|---|---|---|---|---|---|
| | 21 | 22 | 23 | 24 | 25 |
| Dispersion @ 1310 nm | −4.7 | −4.7 | −4.7 | −4.7 | −5.6 |
| Dispersion @ 1400 nm | 0.4 | 0.5 | 0.6 | 0.5 | 0.1 |
| Dispersion @ 1530 nm | 5.6 | 5.7 | 5.9 | 5.7 | 4.2 |
| Dispersion @ 1550 nm | 6.3 | 6.4 | 6.6 | 6.4 | 4.9 |
| Dispersion @ 1625 nm | 8.9 | 8.9 | 9.1 | 9 | 7.8 |
| Slope @ 1550 nm | 0.034 | 0.034 | 0.034 | 0.034 | 0.037 |
| Slope @ 1400 nm | 0.048 | 0.049 | 0.050 | 0.049 | 0.045 |
| Lambda Zero | 1391 | 1390 | 1388 | 1390 | 1399 |
| Aeff @ 1550 nm | 53.7 | 53.8 | 53.7 | 53.8 | 51.2 |
| MFD @ 1550 nm | 8.4 | 8.4 | 8.4 | 8.4 | 8.2 |
| MFD @ 1310 nm | 7.1 | 7.1 | 7.1 | 7.1 | 6.9 |
| Pin Array @ 1550 nm | 9.2 | 8.8 | 8.6 | 9.2 | 2.9 |
| Lateral Load @ 1550 nm | 0.87 | 0.85 | 0.81 | 0.83 | 0.28 |
| Attenuation @ 1550 nm | 0.199 | 0.199 | 0.199 | 0.199 | 0.204 |
| LP02 Cutoff | 1605 | 1609 | 1602 | 1595 | 1496 |
| Cabled Cutoff | 1205 | 1209 | 1202 | 1195 | 1096 |
| LP01 Cutoff | 4660 | 4991 | 4917 | 5000 | 3574 |
| kappa @ 1550 nm | 185 | 188 | 194 | 188 | 132 |

EXAMPLES 26 THROUGH 31

Figure 17:
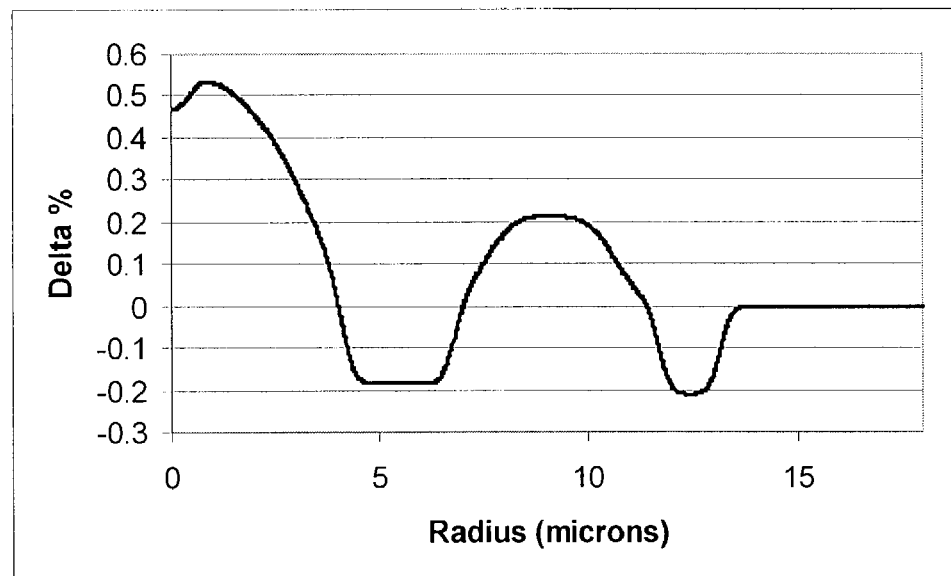
FIG. 17 shows a refractive index profile corresponding to another preferred embodiment of an optical waveguide fiber as disclosed herein.

Table 11 lists the physical parameters of twenty-sixth through thirty-first embodiments (Examples 26–31) of the optical fiber disclosed herein. The relative refractive index profiles of Examples 26–31 are generally represented by the profile of Example 30 shown in FIG. 17, with the corresponding entries for the physical parameters of a particular profile being found in Table 11. Table 12 lists the optical properties of Examples 26–31.

EXAMPLES 32 THROUGH 36

Figure 18:
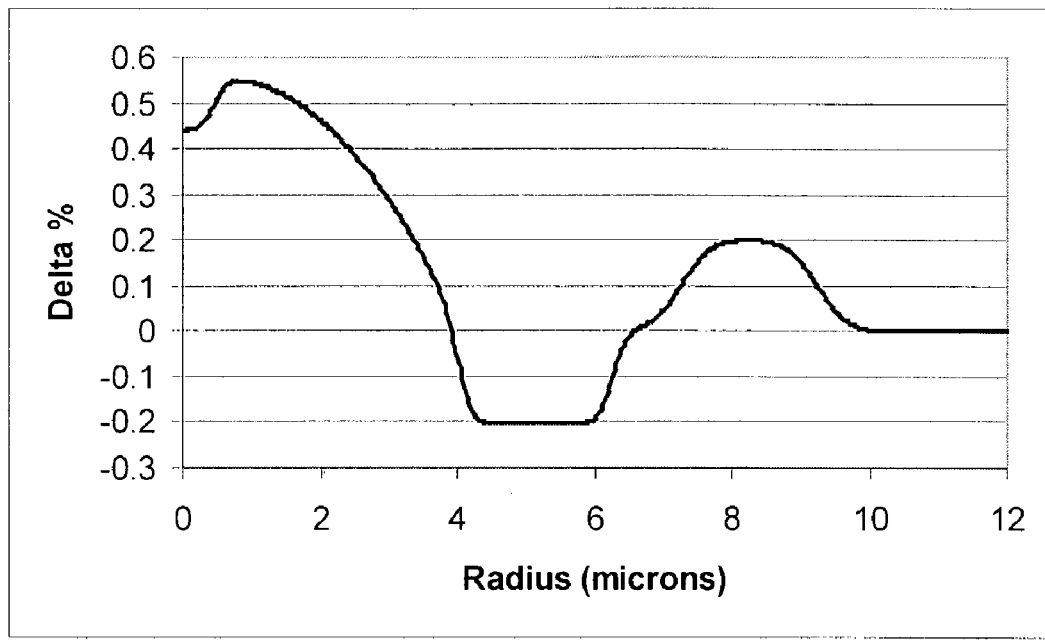
FIG. 18 shows a refractive index profile corresponding to another preferred embodiment of an optical waveguide fiber as disclosed herein.
Figure 19:
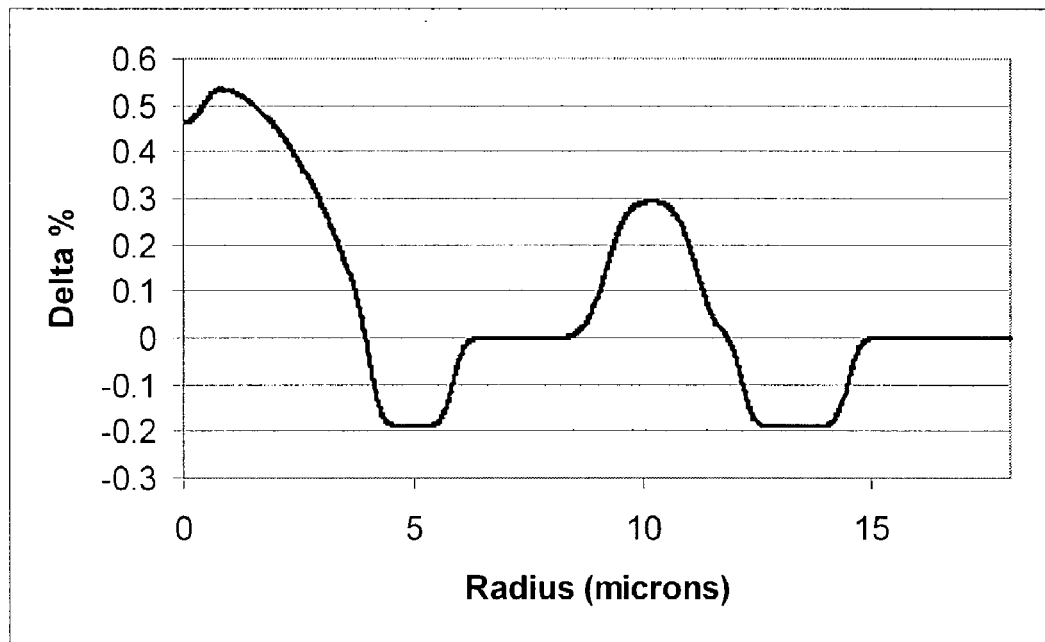
FIG. 19 shows a refractive index profile corresponding to another preferred embodiment of an optical waveguide fiber as disclosed herein.
Figure 20:
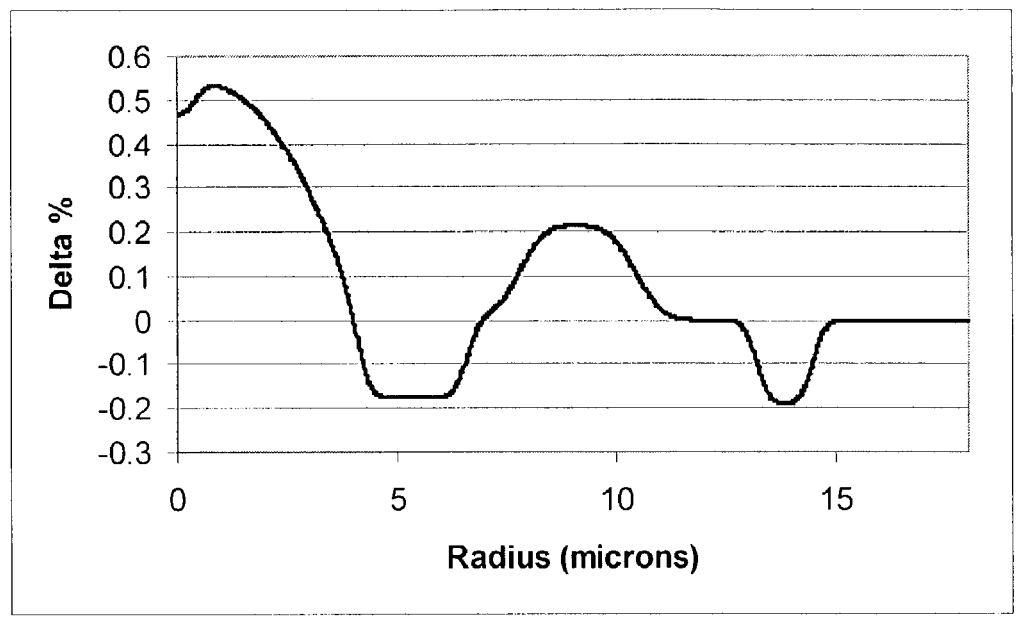
FIG. 20 shows a refractive index profile corresponding to another preferred embodiment of an optical waveguide fiber as disclosed herein.

Table 13 lists the physical parameters of thirty-second through thirty-sixth embodiments (Examples 32–36) of the optical fiber disclosed herein. The relative refractive index profiles of Examples 32–33 are generally represented by the profile of Example 33 shown in FIG. 18, taken in conjunction with the corresponding entries in Table 13. The relative refractive index profiles of Examples 34–35 are generally represented by the profile of Example 35 shown in FIG. 19, taken in conjunction with the corresponding entries in Table 13. The relative refractive index profile of Example 36 is generally represented by the profile shown in FIG. 20, with the corresponding entries for the physical parameters of a particular profile being found in Table 13. Table 14 lists the optical properties of Examples 32–36.

TABLE 11

| | Example | | | | | |
|---|---|---|---|---|---|---|
| | 26 | 27 | 28 | 29 | 30 | 31 |
| $\Delta_{1,MAX}$ | 0.53 | 0.54 | 0.55 | 0.53 | 0.53 | 0.53 |
| $R_{1J}$ | 4 | 3.9 | 3.9 | 4 | 4 | 4 |
| $R_{1,HH}$ | 3.3 | 3.1 | 3.1 | 3.1 | 3.1 | 3.1 |
| $\Delta_{2,MIN}$ | −0.17 | −0.16 | −0.157 | −0.174 | −0.185 | −0.2 |
| $R_{2I}$ | 4 | 3.9 | 3.9 | 4 | 4 | 4 |
| $R_{2J}$ | 7 | 7.1 | 7 | 7.1 | 7 | 6.8 |
| W2 | 3 | 3.2 | 3.1 | 3.1 | 3 | 2.8 |
| R2mid | 5.5 | 5.5 | 5.45 | 5.55 | 5.5 | 5.4 |
| $\Delta_{3,MAX}$ | 0.21 | 0.215 | 0.205 | 0.212 | 0.213 | 0.206 |
| R3i | 7.15 | 7.2 | 7.15 | 7.15 | 7 | 6.85 |
| R3j | 11.7 | 11.2 | 10.75 | 11.75 | 11.35 | 10.95 |
| $R_{3HHi}$ | 7.9 | 7.8 | 7.8 | 7.8 | 7.55 | 7.45 |
| $R_{3HHJ}$ | 11.05 | 10.6 | 10.2 | 11.2 | 10.7 | 10.35 |
| $R_{3HHMID}$ | 9.5 | 9.2 | 9 | 9.5 | 9.1 | 8.9 |
| $R_{4i}$ | 11.8 | 11.25 | 10.85 | 11.8 | 11.4 | 11 |
| $HHPW_3$ | 4.8 | 4.2 | 3.85 | 4.7 | 4.4 | 4.2 |
| $\Delta_{4,MIN}$ | −0.145 | −0.095 | −0.05 | −0.21 | −0.21 | −0.21 |
| $R_{4J}$ | 15.1 | 14.6 | 14 | 14.6 | 13.7 | 12.9 |
| W4 | 3.3 | 3.4 | 3.2 | 2.8 | 2.3 | 1.9 |
| R4mid | 13.5 | 12.9 | 12.4 | 13.2 | 12.6 | 12.0 |
| Central Region Vol. | 2.48 | 2.45 | 2.41 | 2.48 | 2.49 | 2.49 |
| Moat Volume | −2.3 | −2.34 | −2.18 | −2.45 | −2.47 | −2.43 |
| Ring Volume | 6.1 | 5.36 | 4.37 | 6.59 | 5.91 | 5.25 |
| Gutter Volume | −4.92 | −3.1 | −1.55 | −5.61 | −3.84 | −2.4 |
| Total Profile Volume | 1.4 | 2.4 | 3.1 | 1.0 | 2.1 | 2.9 |

TABLE 13

| | Example | | | | |
|---|---|---|---|---|---|
| | 32 | 33 | 34 | 35 | 36 |
| $\Delta_{1,MAX}$ | 0.535 | 0.55 | 0.53 | 0.53 | 0.535 |
| $R_{1J}$ | 4 | 4 | 3.95 | 3.95 | 4 |
| $R_{1,HH}$ | 3.1 | 3.05 | 3.1 | 3.1 | 3.1 |
| $\Delta_{2,MIN}$ | −0.26 | −0.203 | −0.167 | −0.19 | −0.176 |
| $R_{2I}$ | 4 | 4 | 3.95 | 3.95 | 4 |
| $R_{2J}$ | 6.4 | 6.6 | 7 | 6.8 | 6.95 |
| W2 | 2.4 | 2.6 | 3.1 | 2.9 | 3.0 |
| R2mid | 5.2 | 5.3 | 5.5 | 5.4 | 5.5 |
| $\Delta_{3,MAX}$ | 0.222 | 0.2 | 0.234 | 0.294 | 0.214 |
| R3i | 6.55 | 6.7 | 7.75 | 8.55 | 7.05 |
| R3j | 9.65 | 9.85 | 11.85 | 11.8 | 11.2 |
| $R_{3HHi}$ | 7.2 | 7.25 | 8.6 | 9.2 | 7.8 |
| $R_{3HHJ}$ | 9 | 9.25 | 11.2 | 11.2 | 10.4 |
| $R_{3HHMID}$ | 8.1 | 8.25 | 9.9 | 10.2 | 9.1 |
| $R_{4i}$ | 10 | 10.2 | 11.9 | 11.9 | 12.5 |
| $HHPW_3$ | 3.6 | 3.6 | 4.9 | 5.1 | 5.55 |
| $\Delta_{4,MIN}$ | 0 | 0 | −0.19 | −0.19 | −0.19 |
| $R_{4J}$ | | | 15 | 15 | 15 |
| W4 | | | 3.1 | 3.1 | 2.5 |
| R4mid | | | 13.5 | 13.5 | 13.8 |
| Central Region Vol. | 2.52 | 2.47 | 2.46 | 2.47 | 2.49 |
| Moat Volume | −2.28 | −2.29 | −1.95 | −1.65 | −2.25 |
| Ring Volume | 3.35 | 3.3 | 6.13 | 5.87 | 5.18 |
| Gutter Volume | 0 | 0 | −5.77 | −5.79 | −3.41 |
| Total Profile Volume | 3.6 | 3.5 | 0.9 | 0.9 | 2.0 |

TABLE 12

| | Example | | | | | |
|---|---|---|---|---|---|---|
| | 26 | 27 | 28 | 29 | 30 | 31 |
| Dispersion @ 1310 nm | −4.7 | −4.9 | −5.1 | −4.8 | −4.8 | −4.8 |
| Dispersion @ 1400 nm | 0.52 | 0.39 | 0.39 | 0.42 | 0.4 | 0.42 |
| Dispersion @ 1530 nm | 5.8 | 5.7 | 5.9 | 5.6 | 5.7 | 5.7 |
| Dispersion @ 1550 nm | 6.5 | 6.4 | 6.4 | 6.3 | 6.4 | 6.4 |
| Dispersion @ 1625 nm | 9 | 8.9 | 9.1 | 8.9 | 8.9 | 8.9 |
| Slope @ 1550 nm | 0.034 | 0.034 | 0.034 | 0.034 | 0.034 | 0.034 |
| Slope @ 1400 nm | 0.049 | 0.05 | 0.051 | 0.049 | 0.049 | 0.049 |
| Lambda Zero | 1389 | 1392 | 1392 | 1391 | 1392 | 1391 |
| Aeff @ 1550 nm | 53.5 | 52.4 | 51.3 | 53.6 | 53.3 | 52.8 |
| MFD @ 1550 nm | 8.4 | 8.3 | 8.2 | 8.4 | 8.4 | 8.3 |
| MFD @ 1310 nm | 7.1 | 7.05 | 7 | 7.1 | 7.1 | 7.1 |
| Pin Array @ 1550 nm | 9.3 | 9.1 | 9.3 | 9.4 | 9.3 | 9.5 |
| Lateral Load @ 1550 nm | 0.82 | 0.72 | 0.56 | 0.85 | 0.78 | 0.73 |
| Attenuation @ 1550 nm | 0.199 | 0.199 | 0.199 | 0.199 | 0.199 | 0.2 |
| LP02 Cutoff | 1604 | 1602 | 1578 | 1606 | 1599 | 1605 |
| Cabled Cutoff | 1204 | 1202 | 1178 | 1206 | 1199 | 1205 |
| LP01 Cutoff | 5000 | 5000 | 5000 | 5000 | 5000 | 5000 |
| Kappa @ 1550 nm | 191 | 188 | 188 | 185 | 188 | 188 |

TABLE 14

| | Example | | | | |
|---|---|---|---|---|---|
| | 32 | 33 | 34 | 35 | 36 |
| Dispersion @ 1310 nm | −4.8 | −4.9 | −4.9 | −4.9 | −4.9 |
| Dispersion @ 1400 nm | 0.34 | 0.27 | 0.37 | 0.41 | 0.36 |
| Dispersion @ 1530 nm | 5.6 | 5.6 | 5.6 | 5.7 | 5.6 |
| Dispersion @ 1550 nm | 6.3 | 6.4 | 6.3 | 6.4 | 6.3 |
| Dispersion @ 1625 nm | 8.8 | 8.8 | 8.8 | 9 | 8.8 |
| Slope @ 1550 nm | 0.034 | 0.033 | 0.034 | 0.034 | 0.034 |
| Slope @ 1400 nm | 0.049 | 0.05 | 0.049 | 0.05 | 0.049 |
| Lambda Zero | 1393 | 1395 | 1392 | 1392 | 1393 |
| Aeff @ 1550 nm | 52.3 | 51 | 53.3 | 52.7 | 53.5 |
| MFD @ 1550 nm | 8.3 | 8.2 | 8.4 | 8.3 | 8.4 |
| MFD @ 1310 nm | 7 | 7 | 7.1 | 7.1 | 7.1 |
| Pin Array @ 1550 nm | 9.7 | 9.6 | 10 | 9.6 | 8.9 |
| Lateral Load @ 1550 nm | 0.62 | 0.55 | 0.87 | 0.81 | 0.79 |
| Attenuation @ 1550 nm | 0.201 | 0.2 | 0.199 | 0.199 | 0.199 |
| LP02 Cutoff | 1600 | 1600 | 1601 | 1600 | 1604 |
| Cabled Cutoff | 1200 | 1200 | 1201 | 1200 | 1204 |
| LP01 Cutoff | 5000 | 5000 | 5000 | 5000 | 5000 |
| Kappa @ 1550 nm | 185 | 194 | 185 | 188 | 185 |

EXAMPLE 37

Figure 21:
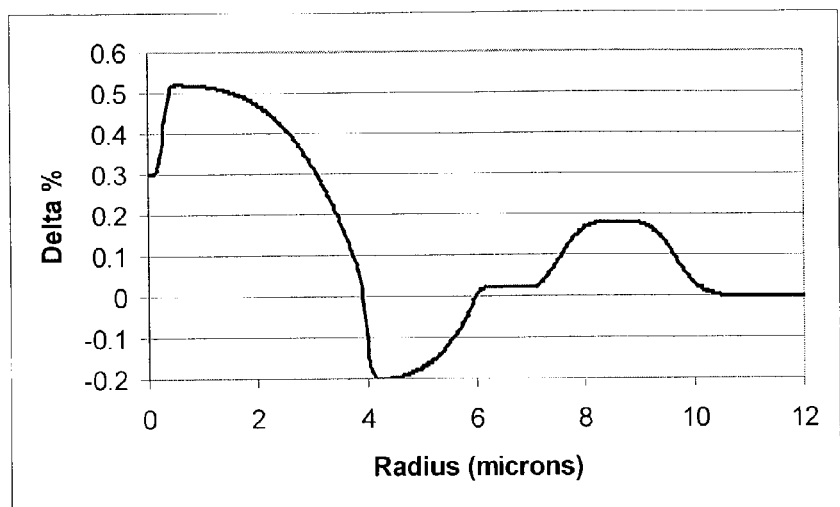
FIG. 21 shows a refractive index profile corresponding to another preferred embodiment of an optical waveguide fiber as disclosed herein.
Figure 22:
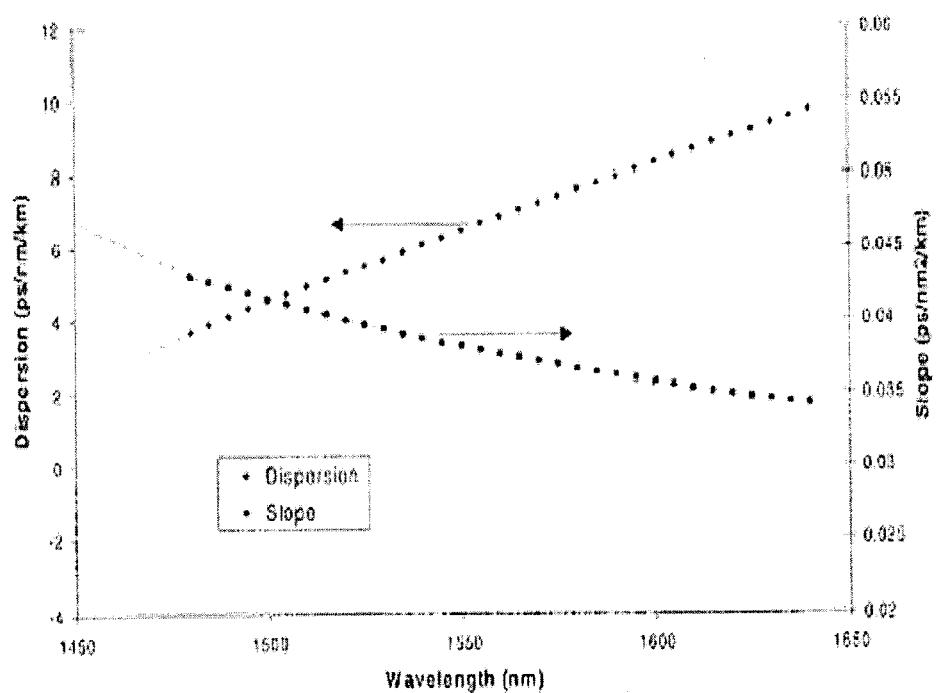
FIG. 22 is a graph of measured dispersion and dispersion slope at various wavelengths for an optical fiber drawn from an optical fiber preform prepared according to the refractive index profile of FIG. 21.

Table 15 lists the physical parameters of a thirty-seventh embodiment (Example 37) of the optical fiber disclosed herein. The relative refractive index profile of Example 37 is represented by the profile shown in FIG. 21, taken in conjunction with the corresponding entries in Table 15. An optical fiber preform was prepared according to the refractive index profile shown in FIG. 21 via vapor deposition process, the optical fiber preform was drawn into optical waveguide fiber, and the measured properties of the fiber are listed in Table 16. FIG. 22 shows the dispersion and dispersion slope measured at various wavelengths for the fiber of FIG. 21.

EXAMPLE 38

Table 15 also lists the physical parameters of a thirty-eighth embodiment (Example 38) of the optical fiber disclosed herein. The relative refractive index profile of Example 38 is represented by the profile shown in FIG. 23, taken in conjunction with the corresponding entries in Table 15.

Figure 23:
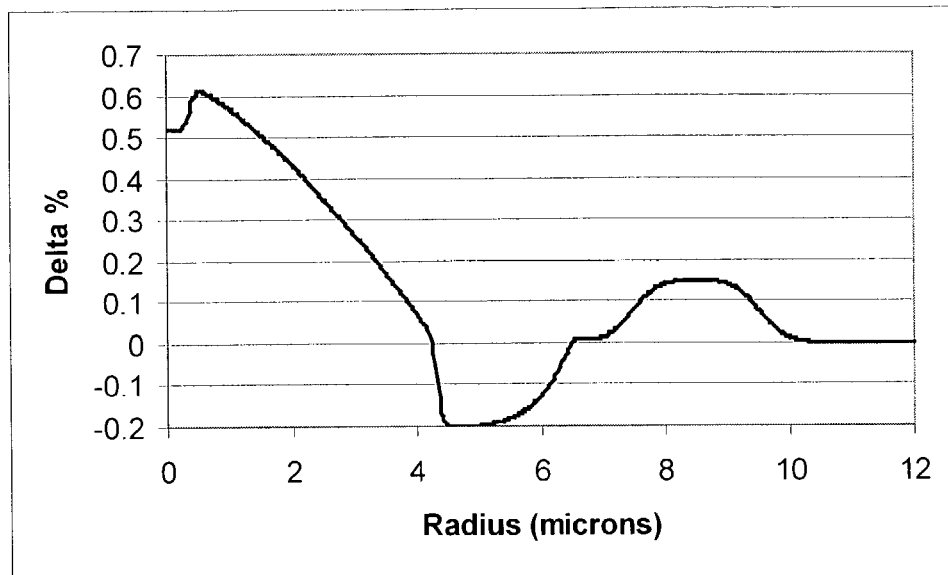
FIG. 23 shows a refractive index profile corresponding to another preferred embodiment of an optical waveguide fiber as disclosed herein.
Figure 24:
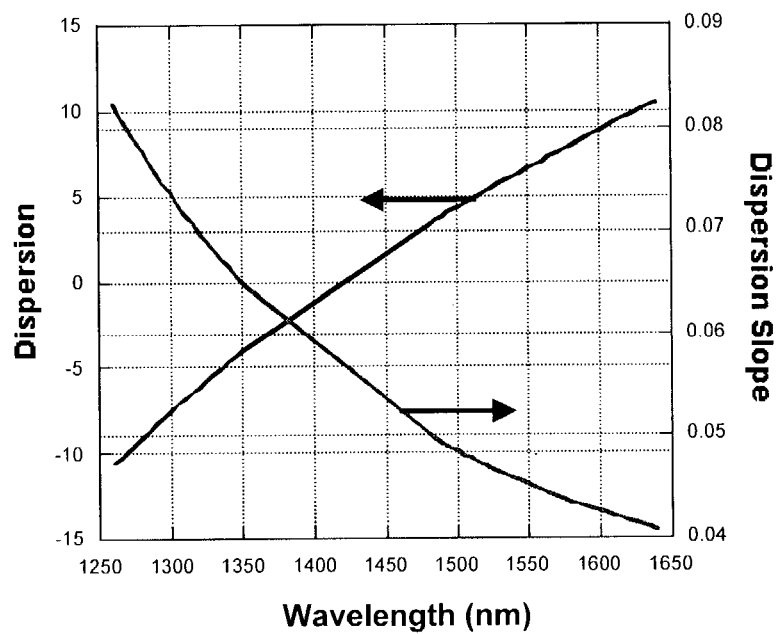
FIG. 24 is a graph of measured dispersion and dispersion slope at various wavelengths for an optical fiber drawn from an optical fiber preform prepared according to the refractive index profile of FIG. 23.
Figure 25:
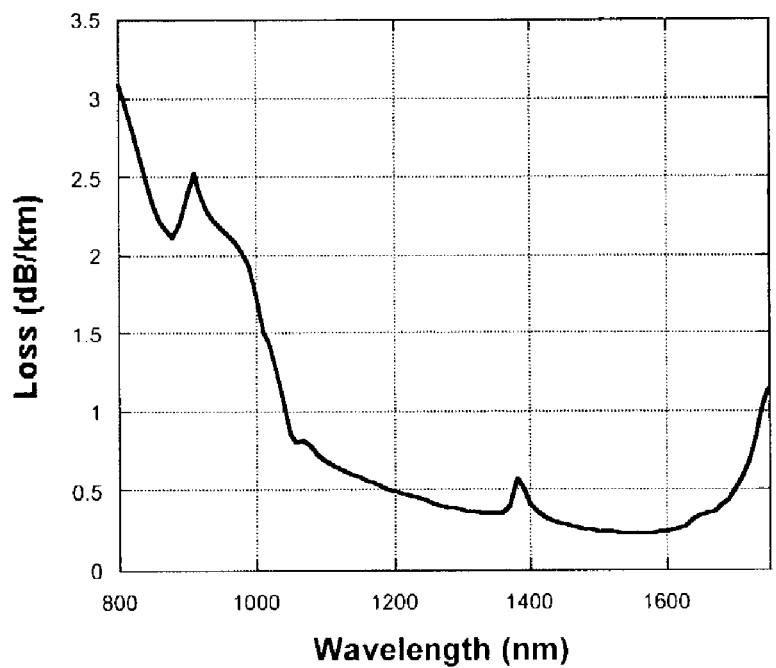
FIG. 25 is a graph of measured attenuation at various wavelengths for an optical fiber drawn from an optical fiber preform prepared according to the refractive index profile of FIG. 23.

An optical fiber was fabricated via an OVD process according to the relative refractive index profile of FIG. 23. The measured properties of the optical fiber of FIG. 23 are listed in Table 16. FIG. 24 shows the dispersion and dispersion slope measured at various wavelengths for the fiber of FIG. 23. FIG. 25 shows the fiber loss or attenuation for the fiber of FIG. 23 measured at various wavelengths.

Various embodiments of the optical fiber disclosed herein could be made via OVD, PCVD, IVD, VAD, or MCVD methods, or by any other appropriate method known by the skilled artisan.

EXAMPLE 39

Figure 26:
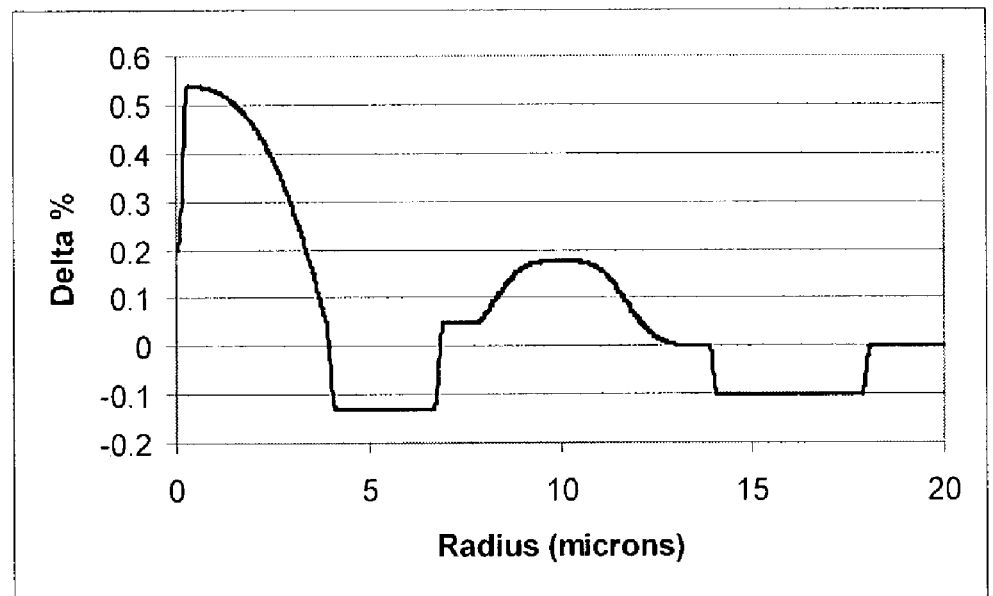
FIG. 26 shows a refractive index profile corresponding to another preferred embodiment of an optical waveguide fiber as disclosed herein.

Table 15 also lists the physical parameters of a thirty-ninth embodiment (Example 39) of the optical fiber disclosed herein. The relative refractive index profile of Example 39 is represented by the profile shown in FIG. 26, taken in conjunction with the corresponding entries in Table 15.

TABLE 15

| | Example | | |
|---|---|---|---|
| | 37 | 38 | 39 |
| $\Delta_{1,MAX}$ | 0.52 | 0.61 | 0.54 |
| $R_{1I}$ | 3.9 | 4.25 | 4 |
| $R_{1,HH}$ | 3.2 | 2.8 | 3.1 |
| $\Delta_{2,MIN}$ | −0.2 | −0.2 | −0.13 |
| $R_{2I}$ | 3.9 | 4.25 | 4 |
| $R_{2J}$ | 6 | 6.5 | 6.85 |
| W2 | 2.1 | 2.3 | 2.9 |
| R2mid | 5.0 | 5.4 | 5.4 |
| $\Delta_{3,MAX}$ | 0.18 | 0.15 | 0.175 |
| R3i | 6 | 6.5 | 6.85 |
| R3j | 10.3 | 10.1 | 13 |
| $R_{3HHi}$ | 7.5 | 7.5 | 8.25 |
| $R_{3HHJ}$ | 9.7 | 9.5 | 11.75 |
| $R_{3HHMID}$ | 8.6 | 8.5 | 10 |
| $R_{4I}$ | 10.3 | 10.1 | 13.85 |
| $HHPW_3$ | 4.3 | 3.6 | 7 |
| $\Delta_{4,MIN}$ | 0 | 0 | −0.1 |
| $R_{4J}$ | | | 18.5 |
| W4 | | | 4.7 |
| R4mid | | | 16.1 |
| Central Region Vol. | 2.57 | 2.52 | 2.51 |
| Moat Volume | −1.43 | −1.79 | −1.95 |
| Ring Volume | 3.47 | 2.65 | 6.44 |
| Gutter Volume | 0 | 0 | −6.38 |
| Total Profile Volume | 4.61 | 3.38 | 0.62 |

TABLE 16

| | 37 | 38 | 39 |
|---|---|---|---|
| Dispersion @ 1310 nm | | −6.8 | −5.0 |
| Dispersion @ 1550 nm | 6.4 | 6.6 | 6.1 |
| Dispersion @ 1565 nm | | | 6.6 |
| Dispersion @ 1625 nm | | | 8.4 |
| Slope @ 1550 nm | 0.038 | 0.045 | 0.032 |
| Slope @ 1600 nm | | | 0.031 |
| Lambda Zero | <1420 | | |
| Aeff @ 1550 nm | | | 53.8 |
| Attenuation @ 1310 nm | | 0.369 | |
| Attenuation @ 1380 nm | | 0.570 | |
| Attenuation @ 1550 nm | | 0.228 | 0.199 |
| MFD @ 1550 nm | 7.8 | 8.5 | 8.4 |
| MFD @ 1310 nm | | 7.1 | |
| Pin Array @ 1550 nm | 1.8 | | 7.4 |

TABLE 16-continued

|  | 37 | 38 | 39 |
|---|---|---|---|
| Lateral Load bend loss (@ 1550 nm)dB/m | | | 0.95 |
| Lateral Load bend loss (@ 1600 nm)dB/m | | | 1.85 |
| LP11 Cutoff | 1216 | | |
| 2 m measured cutoff | | | 1400 |
| Cabled cutoff | | 1050 | 1250 |
| Kappa @ 1550 nm | 170 | 147 | 190 |

Preferably, cutoff wavelength for the LP01 mode, sometimes referred to as the "fundamental mode", is high enough to prevent the appearance of a bend edge. As discussed above, the measured and cabled cutoff wavelengths are lower than the theoretical cutoff wavelength value due to bending and/or mechanical pressure. The theoretical cutoff must therefore be high enough to ensure that any bend edge is above the highest desired wavelength of operation, e.g. to at least 1625 nm in any deployment in the L-band.

Figure 27:
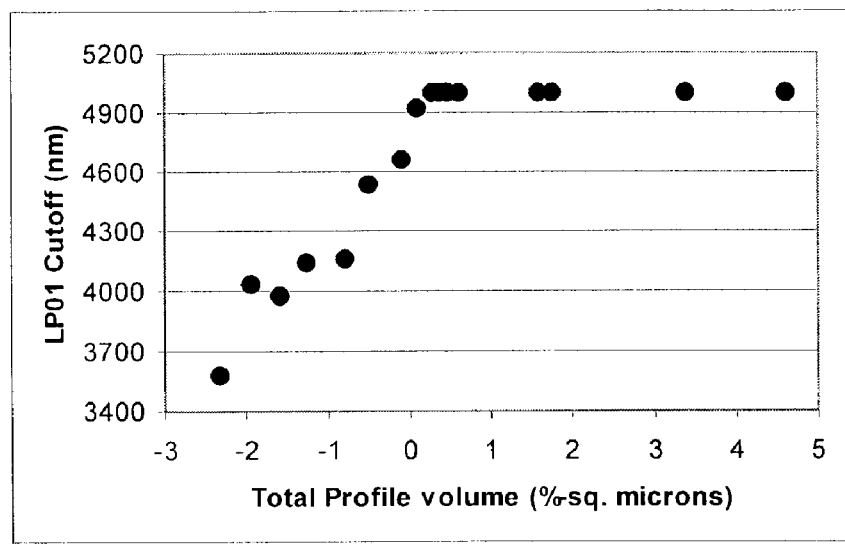
FIG. 27 shows LP01 cutoff wavelength versus total profile volume for preferred embodiments of the fiber disclosed herein.

FIG. 27 shows the LP01 cutoff wavelength, in nm, versus the total profile volume, i.e. the sum of the volumes of the central region, the first annular region, the second annular, and the third annular region (if any), in %-μm$^2$, for representative examples of the fibers disclosed hereinabove.

Preferably, the LP01 cutoff wavelength of the optical fiber disclosed herein is greater than 3500 nm, more preferably greater than about 4000 nm, even more preferably greater than about 4500 nm, and most preferably greater than about 5000 nm.

The total profile volume of the optical fiber disclosed herein is preferably greater than about −3%-μm$^2$, more preferably greater than about −2%-μm$^2$, even more preferably greater than about −1%-μm$^2$, and most preferably greater than about 0%-μm$^2$.

Figure 28:
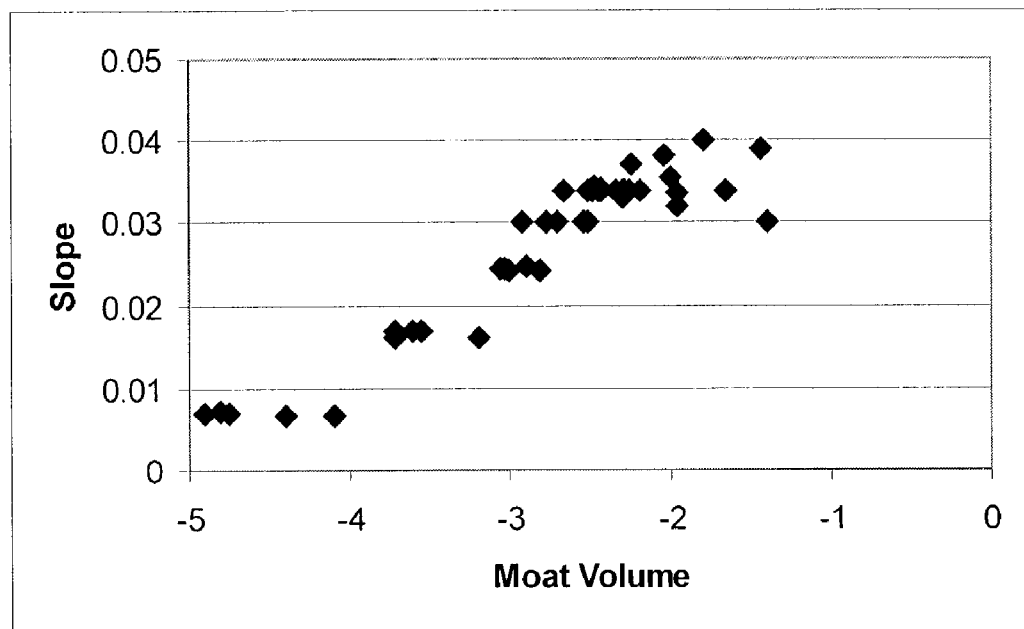
FIG. 28 shows dispersion slope at 1550 nm versus moat volume for preferred embodiments of the fiber disclosed herein.

FIG. 28 shows the dispersion slope at 1550 nm versus moat volume in %-μm$^2$ for representative fibers discussed hereinabove.

Generally, providing a larger absolute value of the magnitude, or the absolute magnitude, of the moat volume results in lower dispersion slope at a wavelength of 1550 nm. Preferably, the absolute magnitude of the profile volume of the moat is greater than about 1%-μm$^2$, more preferably greater than about 2%-μm$^2$. For a dispersion slope at 1550 nm of between 0.02 and 0.03 ps/nm$^2$/km, the moat profile volume is preferably between about −2%-μm$^2$ and about −3%-μm$^2$. For dispersion slope at 1550 nm less than about 0.02 ps/nm$^2$/km, the moat profile volume is preferably less than about −3%-μm$^2$. For dispersion slope at 1550 nm less than about 0.01 ps/nm$^2$/km, the moat profile volume is preferably less than about −4%-μm$^2$.

Figure 29:
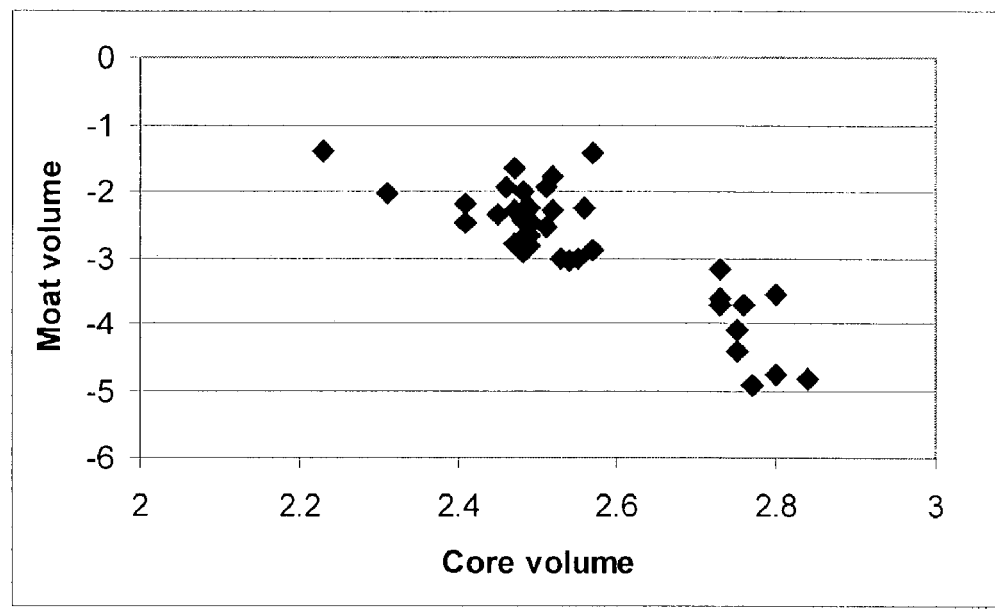
FIG. 29 shows moat volume versus central region volume for preferred embodiments of the fiber disclosed herein.

FIG. 29 shows the moat volume plotted versus central region volume for the fibers disclosed hereinabove.

Preferably, the central region volume is greater than about 2%-μm$^2$, more preferably between about 2%-μm$^2$ and about 3%-μm$^2$. In some preferred embodiments, the central region volume is at least approximately equal to the absolute magnitude of the moat volume. In some preferred embodiments, the central region volume is between about 2.3%-μm$^2$ and about 2.6%-μm$^2$ and the moat volume is between about −1.5%-μm$^2$ and about −3.5%-μm$^2$. In other preferred embodiments, including those exhibiting a dispersion slope at 1550 nm of less than about 0.02 ps/nm$^2$/km, the absolute magnitude of the moat volume is greater than about 3%-μm$^2$ and the central region volume is preferably between about 2.6%-μm$^2$ and about 3.0%-μm$^2$, more preferably between about 2.7%-μm$^2$ and about 2.9%-μm$^2$.

Figure 30:
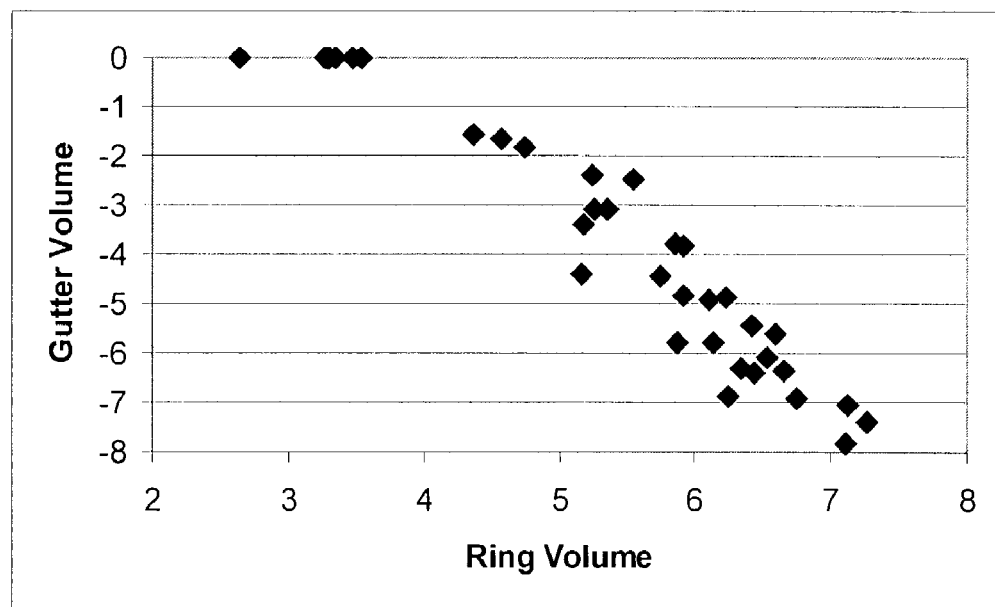
FIG. 30 shows gutter volume versus ring volume for preferred embodiments of the fiber disclosed herein.

FIG. 30 shows the gutter volume plotted versus ring volume for the fibers disclosed hereinabove.

In some preferred embodiments, relative refractive index profile of the fiber has no gutter and the ring volume is less than about 4%μm$^2$, more preferably less than about 3%-μm$^2$.

In other preferred embodiments, the ring volume is greater than about 4%-μm$^2$, and the absolute magnitude of the gutter volume is greater than about 1%-μm$^2$.

Preferably the absolute magnitude of the gutter volume is less than or about equal to the ring volume.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm window, the 1383 nm window, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm window, the 1383 nm window, the S-band, the C-band, and the L-band.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber having an effective area of less than about 60 μm$^2$ at a wavelength of about 1550 nm, a zero-dispersion wavelength of less than about 1430 nm, a dispersion of between about 4 ps/nm/km and about 10 ps/nm/km at a wavelength of about 1550 nm, a dispersion slope of less than 0.045 ps/nm$^2$/km at a wavelength of about 1550 nm, attenuation at a wavelength of 1550 nm of less than 0.20 dB/km, and a cabled cutoff wavelength of less than about 1260 nm.

2. The optical waveguide fiber of claim 1 wherein the effective area is less than about 58 μm$^2$ at a wavelength of about 1550 nm.

3. The optical waveguide fiber of claim 1 wherein the pin array bending loss at a wavelength of about 1600 nm is less than about 25 dB/km.

4. The optical waveguide fiber of claim 1 wherein the effective area is between about 50 μm$^2$ and about 55 μm$^2$ at a wavelength of about 1550 nm.

5. The optical waveguide fiber of claim 1 wherein the dispersion slope is less than about 0.042 ps/nm$^2$/km at a wavelength of about 1550 nm.

6. The optical waveguide fiber of claim 1 wherein the dispersion slope is less than about 0.038 ps/nm$^2$/km at a wavelength of about 1550 nm.

7. The optical waveguide fiber of claim 1 wherein the dispersion slope is less than 0.045 ps/nm$^2$/km and greater than about 0.020 ps/nm$^2$/km at a wavelength of about 1550 nm.

8. The optical waveguide fiber of claim 1 wherein the cabled cutoff wavelength is less than about 1220 nm.

9. The optical waveguide fiber of claim 1 wherein the attenuation at a wavelength of about 1383 nm is less than about 0.6 dB/km.

10. The optical waveguide fiber of claim 1 wherein the attenuation at a wavelength of about 1383 nm is less than about 0.5 dB/km.

11. The optical waveguide fiber of claim 1 wherein the attenuation at a wavelength of about 1383 nm is less than about 0.4 dB/km.

12. The optical waveguide fiber of claim 1 wherein the polarization mode dispersion at a wavelength of about 1550 nm is less than about 0.06 ps/km$^{1/2}$.

13. The optical waveguide fiber of claim 1 wherein the polarization mode dispersion at a wavelength of about 1550 nm is less than about 0.04 ps/km$^{1/2}$.

14. The optical waveguide fiber of claim 1 wherein the polarization mode dispersion at a wavelength of about 1550 nm is less than about 0.03 ps/km$^{1/2}$.

15. The optical waveguide fiber of claim 1 wherein the optical fiber further comprises:
a central region extending radially outward from the centerline and having a positive relative refractive index percent, $\Delta_1\%(r)$ with a maximum relative refractive index percent, $\Delta_{1,MAX}$;
a first annular region adjacent and surrounding the central region and having a negative relative refractive index percent, $\Delta_2\%(r)$, with a minimum relative refractive index percent, $\Delta_{2,MIN}$;
a second annular region adjacent and surrounding the first annular region and having a positive relative refractive index percent, $\Delta_3\%(r)$ with a maximum relative refractive index percent, $\Delta_{3,MAX}$; and
an outer annular cladding region surrounding the second annular region and having a relative refractive index percent, $\Delta_c\%(r)$.

16. The optical waveguide fiber of claim 15 wherein the outer annular cladding region is adjacent and surrounds the second annular region.

17. The optical waveguide fiber of claim 15 wherein $\Delta_{1,MAX}$ is between about 0.4% and 0.7%.

18. The optical waveguide fiber of claim 15 wherein the central region has a radius of between about 3 μm and about 6 μm.

19. The optical waveguide fiber of claim 15 wherein $\Delta_{2,MIN}$ is between about −0.05% and −0.35%.

20. The optical waveguide fiber of claim 15 wherein the first annular region has a width of between about 1.5 μm and about 4.5 μm and a midpoint between about 4 μμm and about 6.5 μm.

21. The optical waveguide fiber of claim 15 wherein $\Delta_{3,MAX}$ is between about 0.1% and 0.3%.

22. The optical waveguide fiber of claim 15 wherein the second annular region has a half-height peak width between about 3 μm and about 9 μm and the midpoint of the half-height peak width is between about 7.5 μm and about 10.5 μm.

23. The optical waveguide fiber of claim 15 further comprising a third annular region adjacent and surrounding the second annular region and disposed between the second annular region and the outer annular cladding region, the third annular region having a negative relative refractive index percent, $\Delta_4\%(r)$ with a minimum relative refractive index percent, $\Delta_{4,MIN}$.

24. The optical waveguide fiber of claim 23 wherein the third annular region has a width of between about 1.5 μm and about 7 μm and a midpoint between about 11 μm and about 18 μm.

25. The optical waveguide fiber of claim 15 wherein the relative refractive index profile of the central region has an alpha of between about 1 and 6.

26. The optical waveguide fiber of claim 1 further comprising:
a central region extending radially outward from the centerline and having a positive relative refractive index percent, $\Delta_1\%(r)$ with a maximum relative refractive index percent, $\Delta_{1,MAX}$;
a first annular region adjacent and surrounding the central region and having a negative relative refractive index percent, $\Delta_2\%(r)$, with a minimum relative refractive index percent, $\Delta_{2,MIN}$;
a second annular region adjacent and surrounding the first annular region and having a positive relative refractive index percent, $\Delta_3\%(r)$ with a maximum relative refractive index percent, $\Delta_{3,MAX}$;
an outer annular cladding region surrounding the second annular region and having a relative refractive index percent, $\Delta_c\%(r)$;
wherein the first annular region has a profile volume of less than about −1.5%-μm$^2$; and
wherein the total profile volume is greater than about −2%-μm$^2$.

27. The optical waveguide fiber of claim 26 wherein $\Delta_{1,MAX}$ is between about 0.4% and 0.7%.

28. The optical waveguide fiber of claim 26 wherein the central region has a radius of between about 3 μm and about 6 μm.

29. The optical waveguide fiber of claim 26 wherein the central region has a radius of between about 3.50 μm and about 4.5 μm.

30. The optical waveguide fiber of claim 26 wherein $\Delta_{2,MIN}$ is between about −0.05% and −0.35%.

31. The optical waveguide fiber of claim 26 wherein the first annular region has a width of between about 1.5 μm and about 4.5 μm and a midpoint between about 4 μm and about 6.5 μm.

32. The optical waveguide fiber of claim 26 wherein $\Delta_{3,MAX}$ is between about 0.1% and 0.3%.

33. The optical waveguide fiber of claim 26 wherein the second annular region has a half-height peak width between about 3 μm and about 9 μm and the midpoint of the half-height peak width is between about 7.5 μm and about 10.5 μm.

34. The optical waveguide fiber of claim 26 further comprising a third annular region adjacent and surrounding the second annular region and disposed between the second annular region and the outer annular cladding region, the third annular region having a negative relative refractive index percent, $\Delta_4$ %(r) with a minimum relative refractive index percent, $\Delta_{4,MIN}$.

35. The optical waveguide fiber of claim 34 wherein the third annular region has a width of between about 1.5 μm and about 7 μm and a midpoint between about 11 μm and about 18 μm.

36. An optical waveguide fiber having an effective area of less than about 60 μm² at a wavelength of about 1550 nm, a zero-dispersion wavelength of less than about 1430 nm, a dispersion of between about 4 ps/nm/km and about 10 ps/nm/km at a wavelength of about 1550 nm, a dispersion slope of less than 0.045 ps/nm²/km at a wavelength of about 1550 nm, an attenuation at a wavelength of about 1383 nm less than about 0.6 dB/km, and a cabled cutoff wavelength of less than about 1260 nm.

37. The optical waveguide fiber of claim 36 wherein the relative refractive index profile of the central region has an alpha of between 1 about and 6.

38. An optical waveguide fiber having an effective area of less than about 60 μm² at a wavelength of about 1550 nm, a zero-dispersion wavelength of less than about 1430 nm, a dispersion of between about 4 ps/nm/km and about 10 ps/nm/km at a wavelength of about 1550 nm, a dispersion slope of less than 0.045 ps/nm²/km at a wavelength of about 1550 nm, polarization mode dispersion at a wavelength of about 1550 nm less than about 0.06 ps/km$^{1/2}$, and a cabled cutoff wavelength of less than about 1260 nm.

39. The optical waveguide fiber of claim 38 wherein the relative refractive index profile of the central region has an alpha of between about 1 and 6.

\* \* \* \* \*